US012639104B2

(12) United States Patent
Frankenfield et al.

(10) Patent No.: US 12,639,104 B2
(45) Date of Patent: May 26, 2026

(54) TECHNIQUES FOR SEQUENTIAL DATA ENRICHMENT

(71) Applicant: CloudFit Software, LLC, Redmond, WA (US)

(72) Inventors: Karch Anthony Frankenfield, Lynchburg, VA (US); Jeremy Robert Olachea, Lynchburg, VA (US)

(73) Assignee: CloudFit Software, LLC, Redmond, WA (US)

( * ) Notice: Subject to any disclaimer, the term of this patent is extended or adjusted under 35 U.S.C. 154(b) by 564 days.

(21) Appl. No.: 18/180,777

(22) Filed: Mar. 8, 2023

(65) Prior Publication Data

US 2024/0305576 A1    Sep. 12, 2024

(51) Int. Cl.
*G06F 9/48* (2006.01)
*G06F 9/38* (2018.01)

(52) U.S. Cl.
CPC .............. *G06F 9/4843* (2013.01); *G06F 9/38* (2013.01); *G06F 9/3867* (2013.01); *G06F 9/48* (2013.01); *G06F 9/4806* (2013.01); *G06F 9/4881* (2013.01)

(58) Field of Classification Search
CPC ............ G06F 9/38; G06F 9/3867; G06F 9/48; G06F 9/4806; G06F 9/4843; G06F 9/4881
See application file for complete search history.

(56) References Cited

U.S. PATENT DOCUMENTS

| | | | |
|---|---|---|---|
| 10,776,091 B1 * | 9/2020 | Wagner | G06F 9/45558 |
| 2009/0031317 A1 * | 1/2009 | Gopalan | G06F 9/5033 |
| | | | 718/103 |
| 2020/0285968 A1 * | 9/2020 | Tse | G06N 5/046 |
| 2022/0067185 A1 * | 3/2022 | Chikoti | G06F 40/151 |
| 2022/0121708 A1 * | 4/2022 | Burnett | G06F 16/9038 |
| 2022/0247773 A1 * | 8/2022 | Caithness | G06F 21/552 |

OTHER PUBLICATIONS

Federico et al, "Pipeliner: A Nextflow-Based Framework for the Definition of Sequencing Data Processing Pipelines", Frontiers in Genetics, Jun. 2019, vol. 10, Article 614, pp. 1-7 (Year: 2019).*
Doshi et al, "Banking Data Enrichment Pipeline", ICCTA 2022: 2022 8th International Conference on Computer Technology Applications, May 12-14, 2022, ACM, pp. 42-47 (Year: 2022).*

* cited by examiner

*Primary Examiner* — Charles M Swift
(74) *Attorney, Agent, or Firm* — Lee & Hayes, P.C.

(57) ABSTRACT

Techniques for performing sequential data enrichment are presented herein. In some examples, a data enrichment system includes an input pipeline and a set of enrichment routines. In some examples, a datagram is retrieved from the input pipeline and an enrichment type associated with the retrieved datagram is determined. In some examples, after determining the enrichment type that is associated with the retrieved datagram, the datagram is processed by the enrichment routine that corresponds to the enrichment type to determine an enriched datagram. In some examples, the enriched datagram is stored in the input pipeline, which can enable determining a new enrichment type associated with the enriched datagram or storing the enriched datagram in an output pipeline if it is determined that the enriched datagram is not associated with any enrichment types.

20 Claims, 10 Drawing Sheets

400

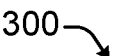
300
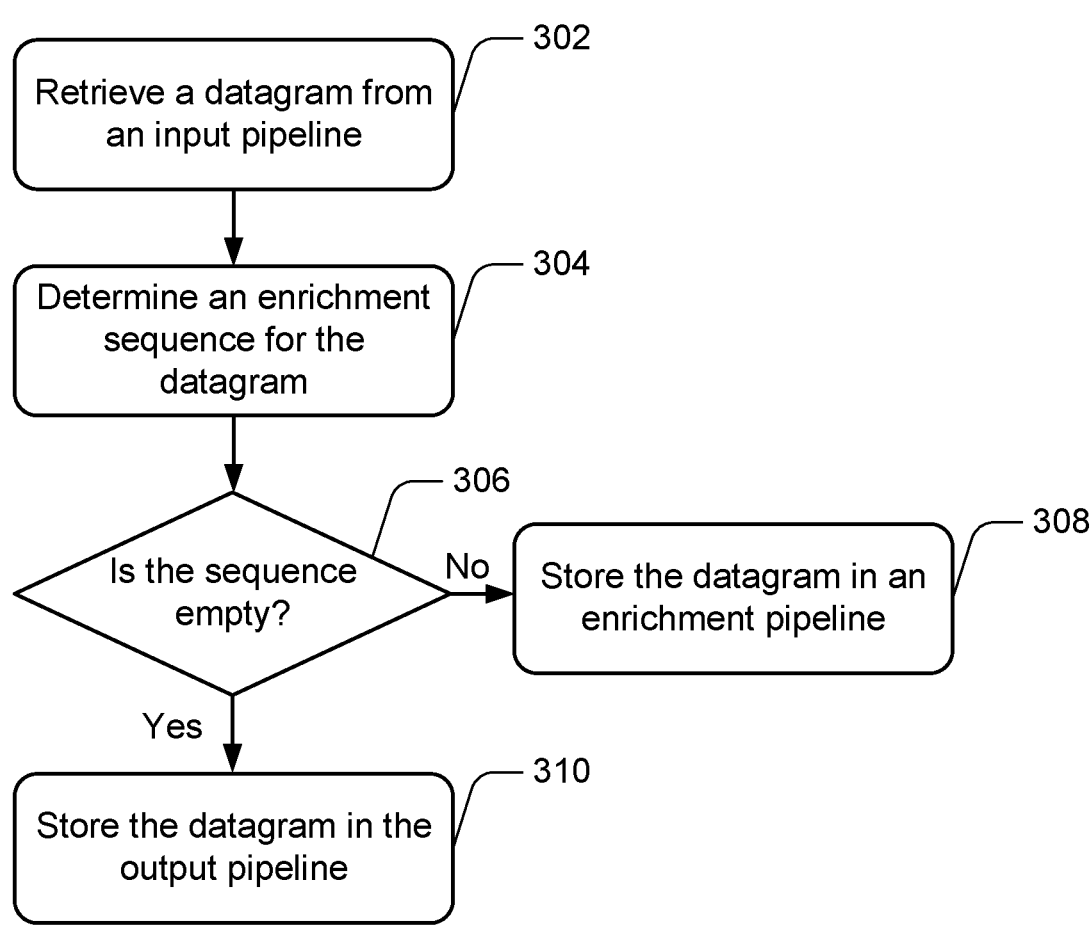
Retrieve a datagram from an input pipeline ⎯ 302
Determine an enrichment sequence for the datagram ⎯ 304
Is the sequence empty? ⎯ 306
No → Store the datagram in an enrichment pipeline ⎯ 308
Yes
Store the datagram in the output pipeline ⎯ 310
FIG. 3

400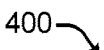
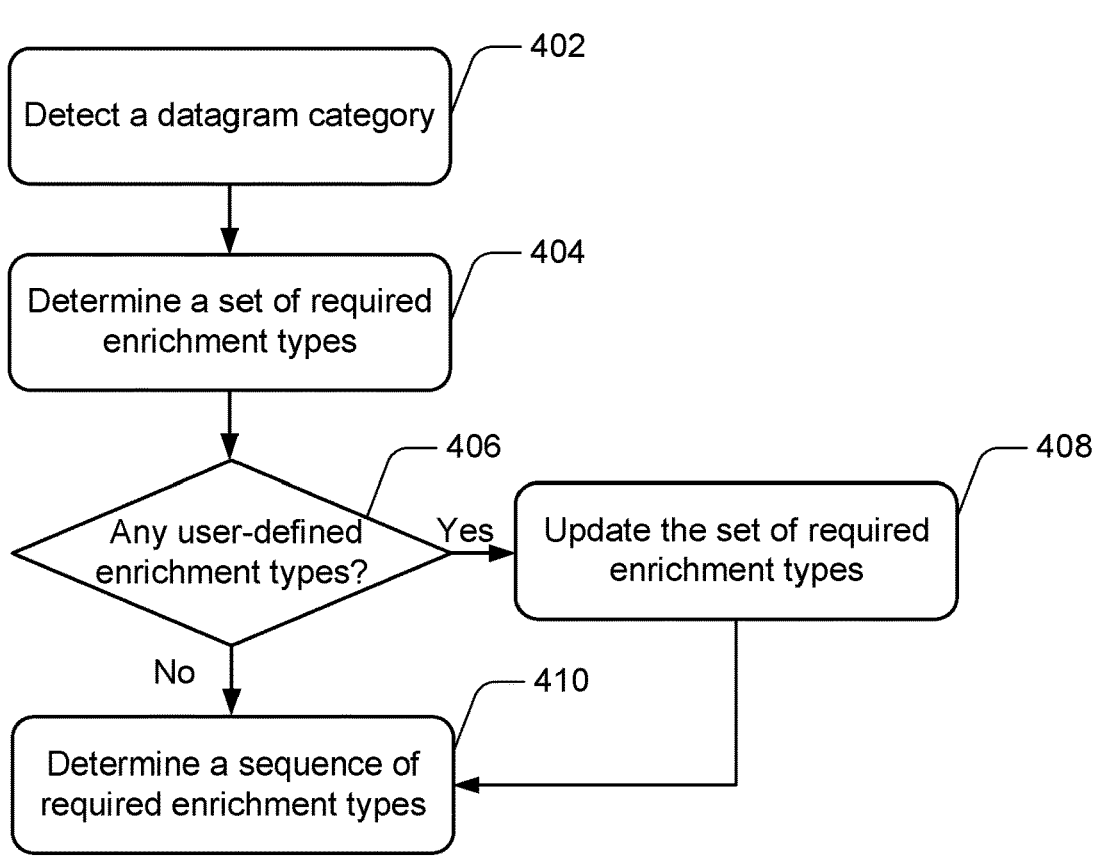
FIG. 4

500

Datagram ID: 9a26354821-5eed-55808-7dgbh5d5d1101

Category: Phishing Report

Parent ID: NULL

Enrichment History: NULL

Enrichment Sequence: [Enrichment A, Enrichment B, Enrichment C]

Payload: [D1]

Figure 6:
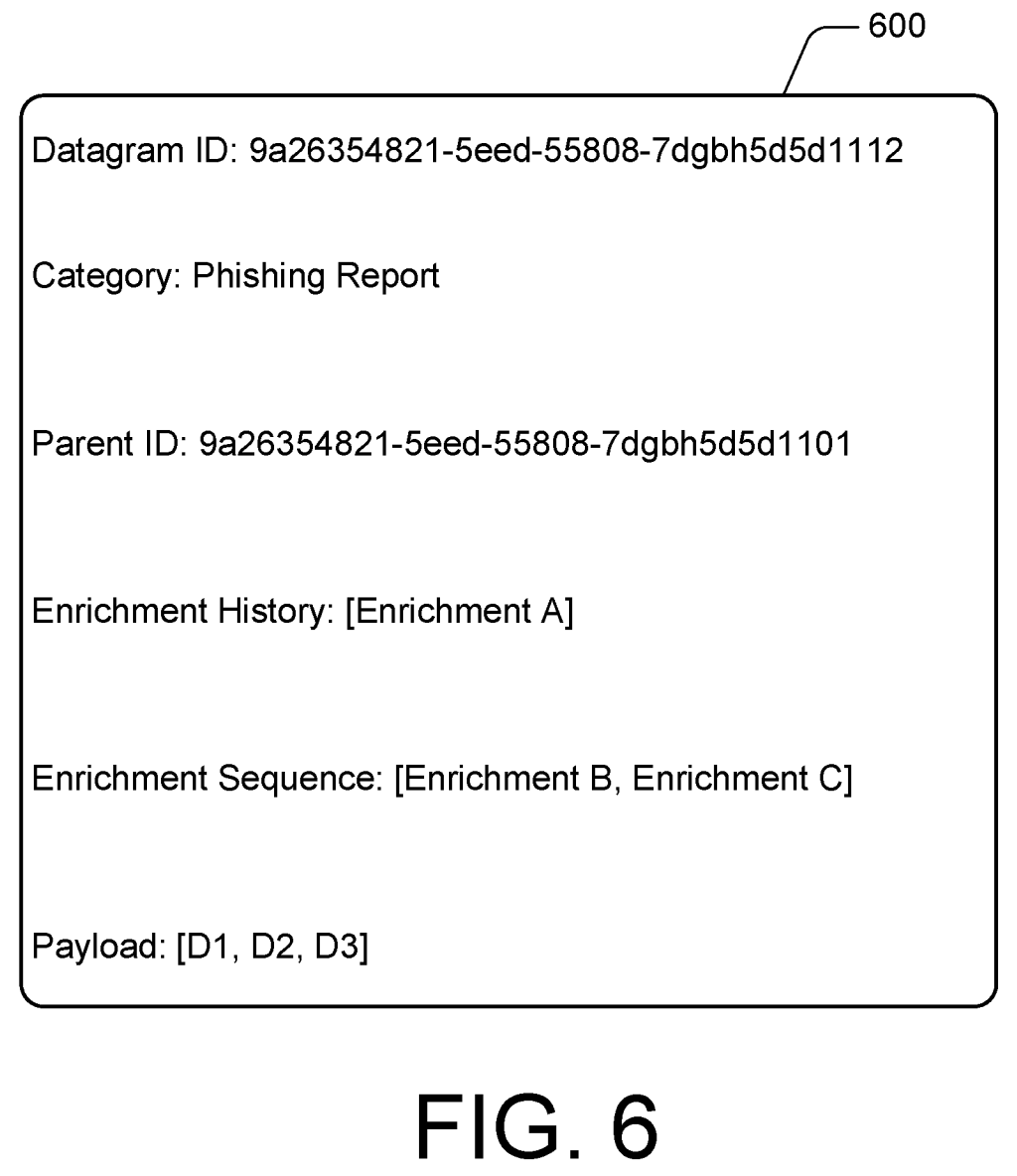

600

Datagram ID: 9a26354821-5eed-55808-7dgbh5d5d1112

Category: Phishing Report

Parent ID: 9a26354821-5eed-55808-7dgbh5d5d1101

Enrichment History: [Enrichment A]

Enrichment Sequence: [Enrichment B, Enrichment C]

Payload: [D1, D2, D3]

Figure 7:
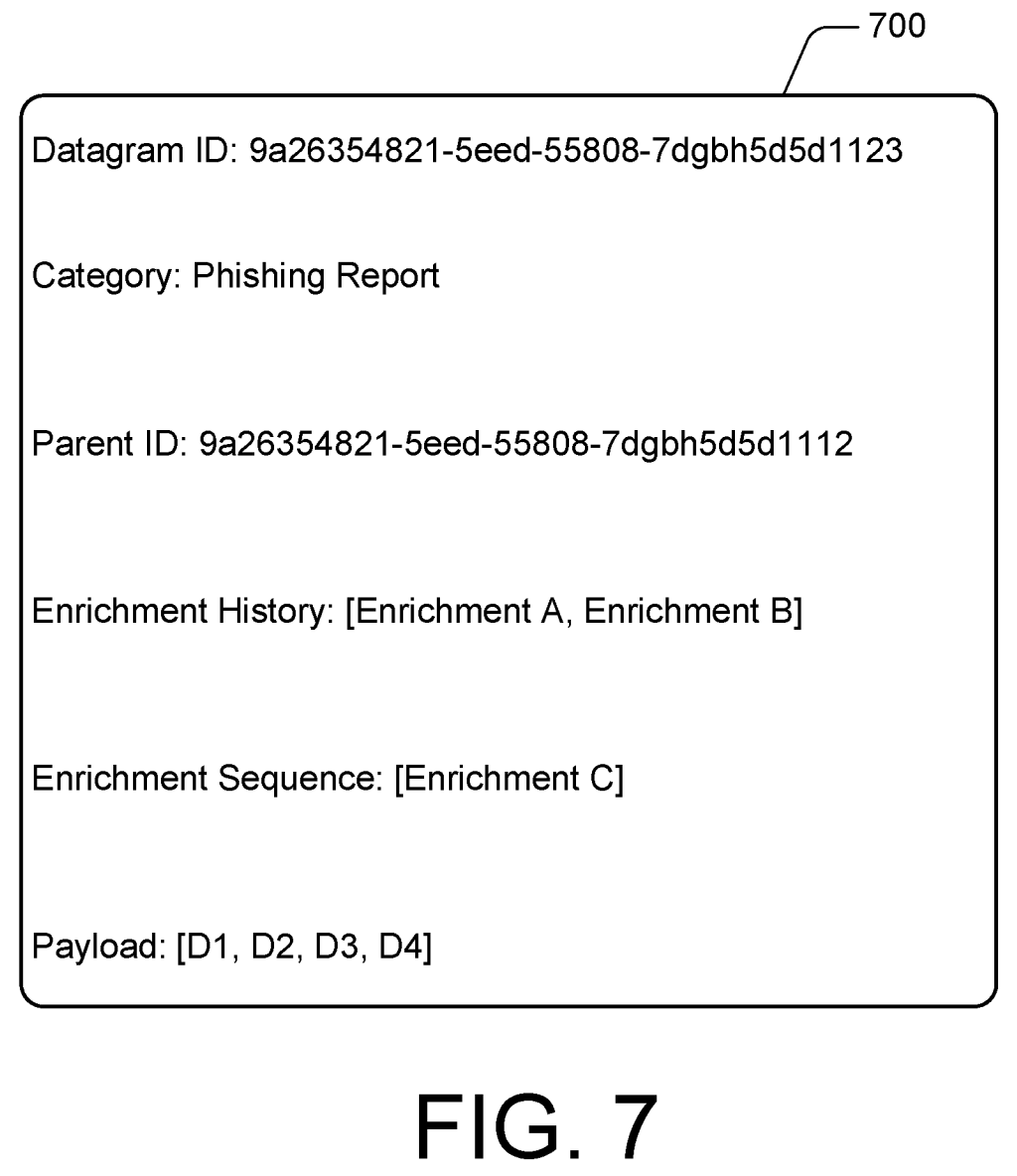

Datagram ID: 9a26354821-5eed-55808-7dgbh5d5d1123

Category: Phishing Report

Parent ID: 9a26354821-5eed-55808-7dgbh5d5d1112

Enrichment History: [Enrichment A, Enrichment B]

Enrichment Sequence: [Enrichment C]

Payload: [D1, D2, D3, D4]

Figure 8:
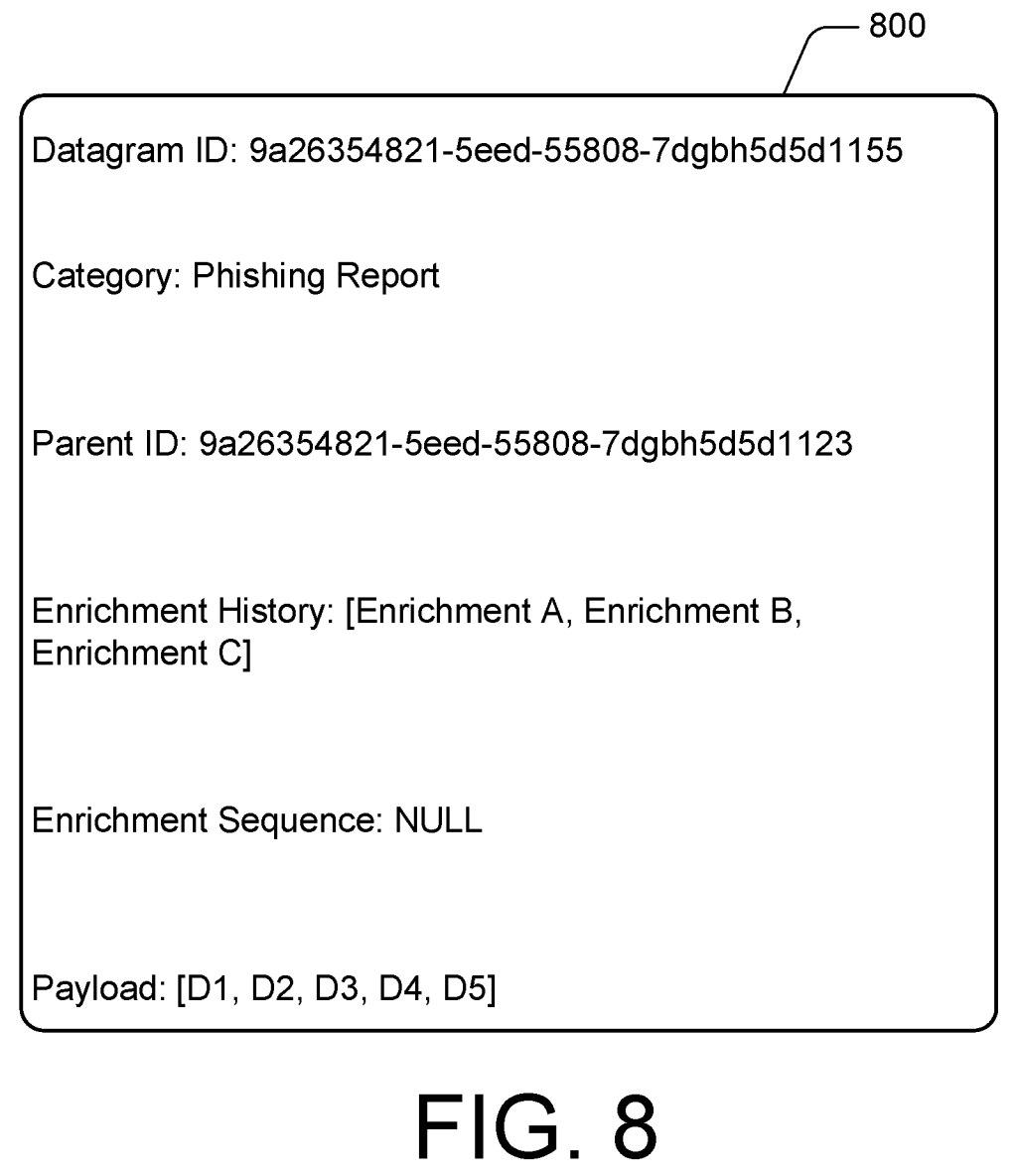

Datagram ID: 9a26354821-5eed-55808-7dgbh5d5d1155

Category: Phishing Report

Parent ID: 9a26354821-5eed-55808-7dgbh5d5d1123

Enrichment History: [Enrichment A, Enrichment B, Enrichment C]

Enrichment Sequence: NULL

Payload: [D1, D2, D3, D4, D5]

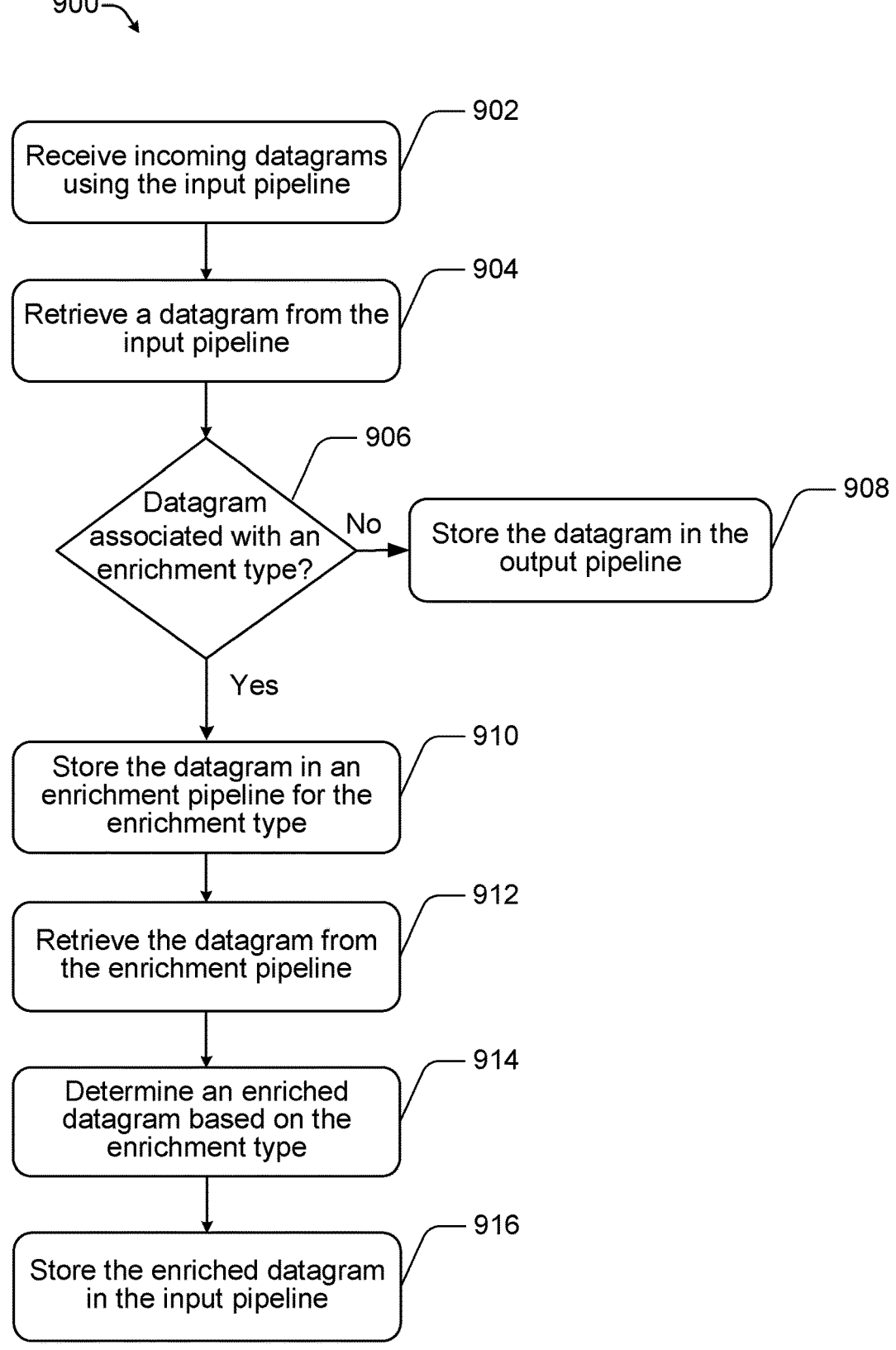

902
Receive incoming datagrams using the input pipeline

904
Retrieve a datagram from the input pipeline

906
Datagram associated with an enrichment type?

No → 908
Store the datagram in the output pipeline

Yes

910
Store the datagram in an enrichment pipeline for the enrichment type

912
Retrieve the datagram from the enrichment pipeline

914
Determine an enriched datagram based on the enrichment type

916
Store the enriched datagram in the input pipeline

FIG. 9

TECHNIQUES FOR SEQUENTIAL DATA ENRICHMENT

BACKGROUND

Performing sequential data enrichment in a real-time or near-real-time in manner is important for many critical data analytics applications, such as many applications related to monitoring of critical computer systems. However, conventional solutions for sequential data enrichment suffer from shortcomings that undermine efficiency, effectiveness, and/or operational speed of such solutions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flowchart diagram of an example process for performing operations of a controller routine.

FIG. 4 is a flowchart diagram of an example process for determining an enrichment type for a datagram.

FIG. 6 provides an example of an enriched datagram generated using a first enrichment in a sequential enrichment process.

FIG. 7 provides an example of an enriched datagram generated using a second enrichment in a sequential enrichment process.

FIG. 8 provides an example of an enriched datagram generated using a third enrichment in a sequential enrichment process.

FIG. 9 is a flowchart diagram of an example process for sequential data enrichment.

DETAILED DESCRIPTION

Figure 1:
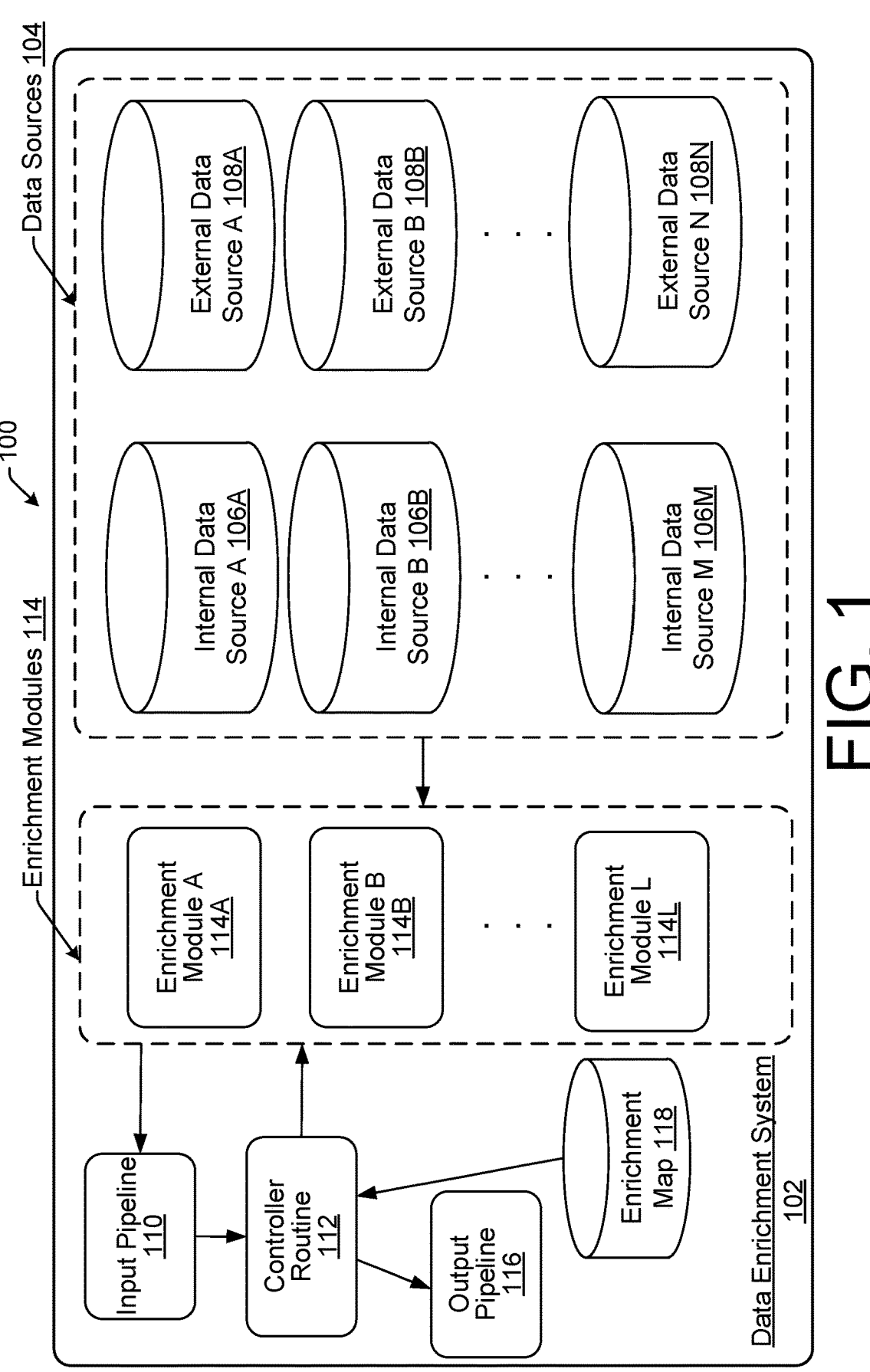
FIG. 1 provides an example architecture for sequential data enrichment.

This application presents techniques for performing sequential data enrichment. In some examples, a data enrichment system includes an input pipeline and a set of enrichment routines. In some examples, a controller routine retrieves a datagram from the input pipeline and determines an enrichment type associated with the retrieved datagram. In some examples, after determining the enrichment type that is associated with the retrieved datagram, the enrichment routine that corresponds to the enrichment type can process the datagram to determine an enriched datagram. In some examples, the enrichment routine stores the enriched datagram in the input pipeline. After the enrichment routine stores the datagram in the input pipeline, the controller routine can determine a new enrichment type associated with the enriched datagram or store the enriched datagram in an output pipeline if the controller routine determines that the enriched datagram is not associated with any enrichment types. In some examples, by using an input pipeline to both store datagrams before assignment of the datagrams to enrichment routines and after processing of the datagrams by the enrichment routines, the techniques described herein enable sequential enrichment of a datagram in a manner that enables using data obtained during an earlier enrichment step to contribute to data enrichment operations in a later enrichment of the enrichment sequence.

In some examples, the techniques described herein can enable event processing in a real-time or near-real-time manner. In some examples, a controller routine can store a first datagram corresponding to an incoming system event (e.g., a system monitoring event, such as a system security exposure event) in the input pipeline of a data enrichment system. The first datagram can represent data fields recorded during the monitoring of the corresponding system. After the first datagram is stored in the input pipeline, a controller routine can retrieve the first datagram from the input pipeline and determine an enrichment sequence associated with the first datagram. The enrichment sequence can represent a sequence of required enrichment types according to which the first datagram should be processed. After determining the enrichment sequence for the first datagram, the controller routine can store the first datagram in an enrichment pipeline for the initial enrichment type in the enrichment sequence. An enrichment routine associated with the initial enrichment type can then retrieve the first datagram from the enrichment pipeline. After retrieving the first datagram from the corresponding enrichment pipeline, the enrichment routine associated with the initial enrichment type can process the first datagram to generate a second datagram and subsequently store the second datagram in the input pipeline. The second datagram can represent an enriched system event that comprises data associated with the incoming system event in addition to data obtained using the operations performed by the enrichment routine associated with the initial enrichment type. After the enrichment routine stores the second datagram in the input pipeline, the controller routine can again retrieve the second datagram, process the second datagram to determine an enrichment sequence associated with the second datagram, and store the second datagram in an enrichment pipeline for an initial enrichment type in the enrichment sequence associated with the second datagram. This process can continue until the controller routine determines that a datagram retrieved from the input pipeline is associated with an empty enrichment sequence and stores the retrieved datagram in an output pipeline based on (e.g., in response to) determining that retrieved datagram is associated with an empty enrichment sequence.

For example, a first datagram retrieved from the input pipeline can represent a first Internet Protocol (IP) address associated with a system security exposure event. The controller routine can retrieve the first datagram to determine the corresponding enrichment sequence $T_1 \rightarrow T_2 \rightarrow T_3$, where $T_1$ is an enrichment type associated with determining an internet provider of the IP address associated with an event, $T_2$ is an enrichment type associated with determining a security protocol associated with the determined internet provider, and $T_3$ is an enrichment type associated with determining a system exposure history associated with the determined security protocol. In accordance with the corresponding enrichment sequence $T_1 \rightarrow T_2 \rightarrow T_3$, the controller routine can store the first datagram in an enrichment pipeline for $T_1$, after which an enrichment routine for $T_1$ can retrieve the first datagram and process the first datagram using enrichment operations associated with $T_1$ to determine a second datagram that represents a first internet provider associated with the first IP address. The enrichment routine for $T_1$ can then store the second datagram in the input pipeline. After the second datagram is stored in the input pipeline, the controller routine can retrieve the second datagram from the input pipeline and determine that the second datagram is associated with the enrichment sequence $T_2 \rightarrow T_3$. In accordance with the corresponding enrichment sequence $T_2 \rightarrow T_3$, the controller routine can store the second datagram in an enrichment pipeline for $T_2$, after which an enrichment routine for $T_2$ can retrieve the second datagram and process the second datagram using enrichment operations associated with $T_2$ to determine a third datagram that represents a first security protocol associated with the first internet provider. The enrichment routine for $T_2$ can then store the third datagram in the input pipeline. After the third datagram is stored in the input pipeline, the controller routine can retrieve the third datagram from the input pipeline and determine that the second datagram is associated with the enrichment sequence $T_3$. In accordance with the corresponding enrichment sequence $T_3$, the controller routine can store the third datagram in an enrichment pipeline for $T_3$, after which an enrichment routine for $T_3$ can retrieve the third datagram and process the third datagram using enrichment operations associated with $T_3$ to determine a fourth datagram that represents a first system exposure history associated with the first security protocol. The enrichment routine for $T_3$ can then store the fourth datagram can in the input pipeline. After the fourth datagram is stored in the input pipeline, the controller routine can retrieve the fourth datagram from the input pipeline, determine that the fourth datagram is associated with an empty enrichment sequence, and store the fourth datagram in an output pipeline based on determining that the fourth datagram is associated with an empty enrichment sequence.

In some examples, the techniques described herein include using an input pipeline to store both incoming datagrams received by a data enrichment system and enriched datagrams determined by enrichment routines of the data enrichment system. In some examples, by storing both incoming datagrams and enriched datagrams in the input pipeline, the techniques described herein enable implementing sequential enrichment workflows using an iterative enrichment mechanism that utilizes a single data structure to store all datagrams whose enrichment completion statuses are pending, regardless of the enrichment histories of the datagrams in the single data structure. The input pipeline may, for example, be a queue data structure, such as a queue data structure whose ordering is based on at least one of the times at which datagrams were stored in the queue data structure or priorities associated with the datagrams stored in the queue data structure. The input pipeline can be associated with an event emitter routine that provides a notification to a routine (e.g., to a controller routine) that is subscribed to the event emitter routine after the event emitter routine detects that a new datagram is stored in the input pipeline.

In some examples, the techniques described herein include retrieving datagrams from an input pipeline. In some examples, the input pipeline is associated with an ordering of datagrams stored in the input pipeline, and the datagrams stored in the input pipeline are retrieved from the input pipeline based on the ordering. In some examples, at a retrieval time, the controller routine retrieves the initial datagram in the ordering from the input pipeline and subsequently removes the retrieved datagram from the input pipeline, so that the controller routine retrieves a subsequent datagram in the ordering during a subsequent retrieval time. In some examples, ordering of datagrams stored in the input pipeline can be based on at least one of the times at which datagrams were stored in the input pipeline or priorities associated with the datagrams stored in the input pipeline.

In some examples, a controller routine retrieves a datagram from the input pipeline after a thread associated with a controller routine becomes available, such as after the controller routine is first executed or after the thread completes the determination of an enrichment sequence for a previously-retrieved datagram. In some examples, the controller routine is associated with two or more threads, such that the controller routine can retrieve a datagram from the input pipeline before determining an enrichment sequence for a previously-retrieved datagram. In some examples, the controller routine is associated with a single thread, such that the controller routine can only retrieve a datagram from the input pipeline after determining an enrichment sequence for a previously-retrieved datagram. In some examples, the controller routine retrieves a datagram from the input pipeline after a controller routine receives a notification from an event emitter routine associated with the input pipeline, where the notification can represent that a new datagram is newly stored in the input pipeline.

In some examples, the techniques described herein include determining a required enrichment type associated with a datagram. In some examples, the required enrichment type of a datagram is the initial enrichment type in an enrichment sequence associated with the datagram. In some examples, the enrichment sequence for a datagram represents a sequence of required enrichment types according to which the datagram should be processed. In some examples, the controller routine determines the enrichment sequence for a datagram based on at least one of: (i) whether the datagram is determined by performing data enrichment operations on another datagram, (ii) whether the datagram is associated with any user-defined enrichment types, (iii) a datagram category associated with the datagram, and (iv) an enrichment map.

In some examples, when an enrichment routine determines a second datagram by performing data enrichment operations corresponding to a first enrichment type on a first datagram, the enrichment sequence for the second datagram includes any enrichment types in the enrichment sequence for the first datagram except for the first enrichment type. In some examples, when an enrichment routine determines a second datagram by performing data enrichment operations corresponding to a first enrichment type on a first datagram, the enrichment sequence for the second datagram only includes the enrichment types in the enrichment sequence for the first datagram except for the first enrichment type. In some examples, when an enrichment routine determines a second datagram by performing data enrichment operations corresponding to a first enrichment type on a first datagram, the enrichment sequence for the second datagram includes the enrichment types in the enrichment sequence for the first datagram except for the first enrichment type as well any enrichment types that were not in the enrichment sequence for the first datagram but are determined based on the second datagram (e.g., an enrichment type determined based on a datagram category of the second datagram that can be different from a datagram category of the first datagram).

In some examples, the enrichment sequence for a datagram includes a first set of required enrichment types for a datagram category associated with the datagram and/or a second set of required enrichment types that include one or more user-defined enrichment types provided as part of the datagram. In some examples, the enrichment map includes data representing that the datagram category is associated with the first set of required enrichment types. For example, the enrichment map can associate each datagram category in a schema of datagram categories with a corresponding set of required enrichment types. In some examples, the enrichment map includes data describing sequential dependencies between two or more enrichment types, such as data describing that a second enrichment type should be performed after a first enrichment type (e.g., because the second enrichment type performs data enrichment operations based on data determined using the data enrichment operations of the first enrichment type). Accordingly, in some examples, the enrichment map can be used to determine at least one of the set of required enrichment operations represented by the enrichment sequence of a datagram or the sequence associated with the set of required enrichment operations.

In some examples, the techniques described herein include storing datagrams associated with an enrichment type in an enrichment pipeline for the enrichment type. In some examples, the controller routine determines that a datagram is associated with an enrichment type based on a determination that the datagram should be processed in accordance with the enrichment type prior to being processed in accordance with any other enrichment types. In some examples, after the controller routine determines that a datagram is associated with an enrichment type, the datagram is stored in the enrichment pipeline for the enrichment type. The enrichment pipeline can be a queue data structure. In some examples, an enrichment pipeline is associated with an ordering of the datagrams in the enrichment pipeline, such as an ordering that is based on at least one of the times at which datagrams were stored in the enrichment pipeline or priorities associated with the datagrams stored in the enrichment pipeline. The enrichment pipeline can be associated with an event emitter routine that provides a notification to a routine (e.g., to a corresponding enrichment routine) that is subscribed to the event emitter routine after the event emitter routine detects that a new datagram is stored in the enrichment pipeline.

In some examples, the techniques described herein include retrieving datagrams from an enrichment pipeline. In some examples, the enrichment pipeline is associated with an ordering of datagrams stored in the enrichment pipeline, and the datagrams stored in the enrichment pipeline are retrieved from the enrichment pipeline based on the ordering. In some examples, at a retrieval time, an enrichment routine retrieves the initial datagram in the ordering from the corresponding enrichment pipeline and subsequently removes the retrieved datagram from the enrichment pipeline, so that the enrichment routine retrieves a subsequent datagram in the ordering during a subsequent retrieval time. In some examples, ordering of datagrams stored in the enrichment pipeline can be determined based on at least one of the times at which datagrams were stored in the enrichment pipeline or priorities associated with the datagrams stored in the enrichment pipeline.

In some examples, the controller routine retrieves a datagram from an enrichment pipeline of an enrichment type after a thread associated with an enrichment routine of the enrichment type becomes available, such as after the enrichment routine first executes or after the thread completes the determination of an enriched datagram based on a previously-retrieved datagram. In some examples, an enrichment routine is associated with two or more threads, such that the enrichment module can retrieve a datagram from the enrichment pipeline before the enrichment routine determines an enriched datagram based on a previously-retrieved datagram. In some examples, an enrichment routine is associated with a single thread, such that the enrichment routine only retrieves a datagram from the enrichment pipeline after the enrichment routines determines an enriched datagram based on a previously-retrieved datagram. In some examples, an enrichment routine retrieves a datagram from a corresponding enrichment pipeline after the enrichment routine receives a notification from an event emitter routine associated with the enrichment pipeline, where the notification can represent that a new datagram is newly stored in the enrichment pipeline.

In some examples, techniques described herein include storing a datagram in an output pipeline. In some examples, the controller routine stores a datagram in the output pipeline based on a determination that the datagram is associated with an empty enrichment sequence. In some examples, the controller routine stores a datagram in the output pipeline based on a determination that the datagram is not associated with any required enrichment types. The output pipeline can be a queue data structure. In some examples, the output pipeline is associated with an ordering of the datagrams in the output pipeline, such as an ordering that is based on at least one of the times at which datagrams were stored in the output pipeline or priorities associated with the datagrams stored in the output pipeline. The output pipeline can be associated with an event emitter routine that provides a notification to a routine (e.g., to a post-enrichment processing routine) that is subscribed to the event emitter routine after the event emitter routine detects that a new datagram is stored in the output pipeline.

In some examples, the techniques described herein include performing post-enrichment operations based on a datagram that is processed in accordance with all of the enrichment types in the enrichment sequence for the datagram. In some examples, after a datagram is processed in accordance with all of the enrichment types in the enrichment sequence for the datagram (e.g., after the datagram is stored in an output pipeline and retrieved from the output pipeline), a post-enrichment routine uses the datagram along with other datagrams (e.g., other datagrams retrieved from the output pipeline) and/or other data to determine a data correlation. The post-enrichment routine can then use the data correlation to determine one or more outputs, such as a system monitoring pattern that is provided to a system administrator routine. In some examples, the post-enrichment routine uses correlations across datagrams retrieved from the output pipeline to monitor a computer system in real-time and/or in near real time and to enable more robust and secure administration of the computer system.

In some examples, the techniques described herein can be implemented to reduce the storage resources needed to enable sequential data enrichment. As described above, in some examples, the techniques described herein enable implementing sequential enrichment workflows using an iterative enrichment mechanism that utilizes a single data structure (e.g., an input pipeline) to store all datagrams whose enrichment completion statuses are pending, regardless of the enrichment histories of the datagrams in the single data structure. For example, in some examples, given T enrichment routines, all of those enrichment routines store their output datagrams in a single data structure, rather than in T separate data structures. Because each data structure has its own associated metadata, reducing the number of data structures in turn reduces the amount of storage resources needed to store the reduced number of data structures. Accordingly, by using a single data structure to store all datagrams whose enrichment completion statuses are pending, the techniques described herein can reduce the storage resources needed to enable sequential data enrichment.

In some examples, the techniques described herein can be implemented to reduce the throughput of a data enrichment system having a set of enrichment routines. In some examples, the enrichment routines can operate in parallel to reduce the effect of operational dependencies across enrichment routines on system throughput. For example, consider a scenario in which a second enrichment routine is operationally dependent on a first enrichment routine (e.g., the second enrichment routine uses data that is determined using data enrichment operations of the first enrichment routine). In this example scenario, while the first enrichment routine is processing a first datagram, the second enrichment routine can process a second datagram instead of idly waiting for the first enrichment routine to finish its processing. Accordingly, by reducing the amount of idle time associated with enrichment routines in a data enrichment system, the techniques described herein can reduce the throughput of the data enrichment system.

In some examples, the techniques described herein can be implemented to enhance the security of a computer system. As described above, one example application of the techniques described herein relates to real-time or near-real-time event processing, such as real-time or near-real-time processing of system security exposure events. In some examples, the techniques described herein enable efficient and effective enrichment of system security exposure events to determine enriched event data that a monitoring system can use to engineer higher-order monitoring data for a monitored computer system. Accordingly, by enabling higher-order monitoring data for a computer system, the techniques described herein can enhance security and reliability of computer systems.

The methods, apparatuses, and systems described herein can be implemented in a number of ways. Examples are provided below with reference to the following figures. Although discussed in the context of data enrichment, the methods, apparatuses, and systems described herein can be applied to a variety of data processing systems that perform sequential processing of datagrams using a set of data processing routines. Moreover, although various examples are described in relation to event processing domains (e.g., with respect to system exposure events), a person of ordinary skill in the relevant technology will recognize that various techniques described herein can be used to perform data processing operations and/or data enrichment operations in other application domains.

FIG. 1 provides an example architecture 100 for sequential data enrichment. As depicted in FIG. 1, the architecture 100 includes a data enrichment system 102 and a set of data sources 104, including M internal data sources 106A-106M that are stored in a local data storage framework associated with the data enrichment system 102 and N external data sources 108A-108N that are stored in a remote data storage framework associated with the data enrichment system 102. In some examples, the data enrichment system 102 is configured to enrich a datagram using the data stored in the data sources 104. To enrich a datagram, the data enrichment system 102 can use at least one of an input pipeline 110, a controller routine 112, a set of L enrichment modules 114A-114L, an output pipeline 116, and an enrichment map 118.

As further depicted in FIG. 1, the input pipeline 110 can be a data structure that is configured to store at least one datagram. A datagram can be any collection of data that is determined to be related to a common subject matter, such as any collection of event data associated with a recorded event (e.g., a recorded system event). In some examples, the input pipeline 110 is configured to store at least one of the following: an unenriched datagram that has not been processed by any of the enrollment modules 114A-114L or an enriched datagram that has been generated by one of the enrollment modules 114A-114L via processing another datagram. For example, an unenriched datagram can represent data associated with a data enrichment request provided to the data enrichment system 102 (e.g., event data associated with a recorded event that is associated with a data enrichment request provided to the data enrichment system 102).

In some examples, the input pipeline 110 is a queue data structure. In some examples, the input pipeline 110 is associated with an event emitter routine. In some examples, the event emitter routine of the input pipeline is configured to: (i) maintain a list of routines that are subscribed to the event emitter routine, (ii) detect the addition of a datagram to the input pipeline 110, and (iii) provide a notification to each subscribed routine on the list based on detecting the addition of the datagram to the input pipeline 110. In some examples, a notification provided by the event emitter routine of the input pipeline 110 represents that a datagram has been added to the input pipeline 110. In some examples, the list of subscribers to the event emitter routine of the input pipeline 110 includes the controller routine 112.

In some examples, the input pipeline 110 maintains an ordering of the datagrams stored on the input pipeline, such as a queue ordering. In some examples, the ordering of the datagrams stored on the input pipeline 110 is based on the times in which the datagrams are added to the input pipeline 110, for example such that the input pipeline operates in a first-in-first-out (FIFO) manner. In some examples, the ordering of the datagrams stored on the input pipeline 110 is determined based on priorities of the datagrams, for example such that the controller routine retrieves a more system-critical datagram before a less-system-critical datagram. In some examples, the ordering of the datagrams stored on the input pipeline 110 is determined based on both the times in which the datagrams are added to the input pipeline 110 and the priorities of the datagrams stored on the input pipeline 110. For example, in some examples, a controller routine combines (e.g., multiplies) a priority score and a latency score of a datagram that is stored on the input pipeline 110 to determine an adjusted priority score for the datagram. In some examples, the controller routine orders the datagrams stored on the input pipeline 110 based on corresponding adjusted priority scores, such as based on a descending ordering of the adjusted priority scores for the datagrams stored on the input pipeline 110.

As further depicted in FIG. 1, the controller routine 112 can be a computer-implemented routine that is configured to retrieve a datagram from the input pipeline 110 and determine an enrichment type that is associated with the retrieved datagram. In some examples, the controller routine 112 is configured to retrieve a first/initial datagram stored on the input pipeline 110 as determined in accordance with the ordering associated with the datagrams stored on the input pipeline 110. In some examples, the controller routine 112 is associated with one or more execution threads, where each execution thread is configured to retrieve a datagram from the input pipeline 110 and determine an enrichment type associated with the retrieved datagram. In some examples, when the number of execution threads associated with the controller routine 112 is more than one, the controller routine 112 enables parallelized processing of datagrams retrieved from the input pipeline 110, such that the controller routine 112 can retrieve a datagram from the input pipeline 110 before the controller routine 112 determines the enrichment type associated with a previously-retrieved datagram. In some examples, the controller routine 112 is configured to retrieve a datagram from the input pipeline 110 based on receiving a notification from the event emitter routine associated with the input pipeline 110. In some examples, the notification represents that a new datagram has been added to the input pipeline 110. In some examples, the controller routine 112 is subscribed to the event emitter routine associated with the input pipeline 110.

In some examples, the controller routine 112 is configured to determine an enrichment type associated with a datagram that is retrieved from the input pipeline 110. In some examples, the data enrichment system 102 is associated with L enrichment types, where each of the L enrichment types corresponds to one of the L enrichment modules 114 associated with the data enrichment system 102. An enrichment type can represent a set of data enrichment operations, where a data enrichment operation can be configured to map first data in a datagram to second data retrieved from the data sources 104 and determine an enriched datagram based on the second data. Examples of enrichment types include an enrichment type associated with determining an internet provider of an IP address associated with an event, an enrichment type associated with determining a security protocol associated with an internet provider, and an enrichment type associated with determining a system exposure history associated with a security protocol. In some examples, each enrichment type is associated with a set of data enrichment operations that are configured to be performed by an enrichment routine. An enrichment routine can be a computer-implemented process that is configured to determine an enriched datagram for a first datagram using a set of data enrichment operations associated with the corresponding enrichment type.

In some examples, the controller routine 112 determines that an enrichment type is associated with a datagram based on determining that the datagram should be processed in accordance with the enrichment. In some examples, the controller routine 112 determines that an enrichment type is associated with a datagram based on determining that the datagram should be processed in accordance with the enrichment before being processing in accordance with any other enrichment types. In some examples, to determine an enrichment type associated with a datagram, the controller routine 112 determines an enrichment sequence for the datagram that represents a sequence of required enrichment types for the datagram and subsequently determines the enrichment type that is associated with the datagram based on the determined enrichment sequence. For example, in some examples, the controller routine 112 determines that a datagram is associated with a first/initial enrichment type in the determined enrichment sequence for the datagram.

In some examples, each datagram that the controller routine 112 retrieves from the input pipeline 110 is either an unenriched datagram that has not been processed by any of the enrichment modules 114 or is an enriched datagram that is determined after an unenriched datagram is sequentially processed using one or more enrichment modules 114. Accordingly, in some examples, a retrieved datagram is associated with a "parent" datagram that is the unenriched datagram whose sequential processing caused the retrieved datagram to be generated, with an unenriched datagram being a parent of itself. In some examples, a retrieved datagram that is generated after n sequential enrichment module iterations is associated with the (n+1)th enrichment type in the enrichment sequence of its parent. Thus, in some examples, an enrichment sequence is determined once for the parent/unenriched datagram and then the controller routine 112 uses the single enrichment sequence throughout the sequential processing of the parent/unenriched datagram to determine enrichment types associated with the resulting "children" enriched datagrams.

As described above, in some examples, to determine an enrichment type that is associated with a datagram, the controller routine 112 first determines an enrichment sequence for the datagram and then selects the first/initial enrichment type in the enrichment sequence as the enrichment type that is associated with the datagram. For example, if the controller routine 112 determines that a datagram is associated with the enrichment sequence $T_1 \rightarrow T_2 \rightarrow T_3$, the controller routine 112 can determine that the datagram is associated with the enrichment type $T_1$, as the $T_1$ is the first/initial enrichment type in the enrichment sequence and thus takes precedence over the remaining two enrichment types.

In some examples, the controller routine 112 determines an enrichment sequence for a datagram based on at least one of: (i) whether the datagram is determined by performing data enrichment operations on another datagram, (ii) whether the datagram is associated with any user-defined enrichment types, (iii) a datagram category associated with the datagram, and (iv) an enrichment map. Example techniques for determining an enrichment sequence for a datagram based on user-defined enrichment types and the corresponding datagram category are described in greater detail below with reference to FIG. 4.

In some examples, when an enrichment routine determines a second datagram by performing data enrichment operations corresponding to a first enrichment type on a first datagram, the second datagram inherits all of the enrichment types of the first datagram except for the first enrichment type, and thus the enrichment sequence for the second datagram includes any enrichment types in the enrichment sequence for the first datagram except for the first enrichment type. In some examples, after the controller routine retrieves an unenriched datagram (e.g., a datagram that has not been processed by any enrichment routines) from the input pipeline, the controller routine determines a first enrichment sequence for the unenriched datagram (e.g., based on at least one of any user-defined enrichment types associated with the datagram or a datagram category associated with the datagram). In some examples, the data enrichment system 102 then processes the unenriched datagram in accordance with the first enrichment sequence such that, if the first enrichment sequence is a sequence of T enrichment types, a sequence of T enrichment routines corresponding to the sequence of T enrichment types are executed to determine a corresponding sequence of T enriched datagrams. In some examples, the enrichment sequence for an nth enriched datagram in the sequence of T enriched datagram is the first enrichment sequence minus the first (n+1) enrichment types of the first enrichment sequence. In other words, after each enrichment routine corresponding to an initial enrichment type in an enrichment sequence is executed, an enriched datagram is determined whose enrichment sequence excludes the initial enrichment type. In this manner, the enrichment sequence of a "child" datagram can be determined based on the enrichment sequence of a "parent" datagram, as the former sequence does not include any datagrams that are not part of the latter.

For example, the controller routine 112 can retrieve a first datagram from the input pipeline 110 to determine enrichment sequence $T_1 \rightarrow T_2 \rightarrow T_3$. In accordance with the corresponding enrichment sequence $T_1 \rightarrow T_2 \rightarrow T_3$, the controller routine can store the first datagram in an enrichment pipeline for $T_1$, after which an enrichment routine for $T_1$ can retrieve the first datagram and process the first datagram using enrichment operations associated with $T_1$ to determine a second datagram. The enrichment routine for $T_1$ can then store the second datagram in the input pipeline. After the second datagram is stored in the input pipeline, the controller routine can retrieve the second datagram from the input pipeline and determine that the second datagram is associated with the enrichment sequence $T_2 \rightarrow T_3$. In accordance with the corresponding enrichment sequence $T_2 \rightarrow T_3$, the controller routine can store the second datagram in an enrichment pipeline for $T_2$, after which an enrichment routine for $T_2$ can retrieve the second datagram and process the second datagram using enrichment operations associated with $T_2$ to determine a third datagram. The enrichment routine for $T_2$ can then store the third datagram in the input pipeline. After the third datagram is stored in the input pipeline, the controller routine can retrieve the third datagram from the input pipeline and determine that the second datagram is associated with the enrichment sequence $T_3$. In accordance with the corresponding enrichment sequence $T_3$, the controller routine can store the third datagram in an enrichment pipeline for $T_3$, after which an enrichment routine for $T_3$ can retrieve the third datagram and process the third datagram using enrichment operations associated with $T_3$ to determine a fourth datagram. The enrichment routine for $T_3$ can then store the fourth datagram can in the input pipeline. After the fourth datagram is stored in the input pipeline, the controller routine can retrieve the fourth datagram from the input pipeline, determine that the fourth datagram is associated with an empty enrichment sequence, and store the fourth datagram in an output pipeline based on determining that the fourth datagram is associated with an empty enrichment sequence. As this example illustrates, the controller routine can determine the enrichment sequence for a child datagram by removing one enrichment type from the enrichment sequence of the corresponding parent datagram.

In some examples, when an enrichment routine determines a second datagram by performing data enrichment operations corresponding to a first enrichment type on a first datagram, the enrichment sequence for the second datagram includes: (i) the enrichment types in the enrichment sequence for the first datagram except for the first enrichment type, and (ii) any enrichment types that were not in the enrichment sequence for the first datagram but that the controller routine 112 determines based on the second datagram. In other words, in some examples, the enrichment sequence for a "child" datagram can include enrichment types that were not in the enrichment sequence of the corresponding "parent" datagram. For example, if an enrichment routine processes a first datagram in accordance with a first enrichment type to determine a second datagram, the second datagram can have a second datagram category that is different (e.g., more specific) than a first datagram category of the first datagram. In some examples, the second datagram category can be associated with a second set of required enrichment types that includes at least one enrichment type that is not in a first set of required enrichment types associated with the first datagram category. For example, the first datagram can correspond to a general system event and be associated with a first enrichment type that is associated with determining an event type of the general system, while the second datagram can correspond to a Denial-of-Service (DoS) attack event and be associated with a second enrichment type that is associated with determining a DoS attack rate for the corresponding DoS attack event.

In some examples, to determine an enrichment sequence for a datagram, the controller routine 112 first determines a set of required enrichment types that are associated with (e.g., required for) the datagram and then determines a sequence of the associated enrichment types. In some examples, the sequence associated with the associated enrichment types of a datagram is determined based on data represented by the enrichment map 118. In some examples, the enrichment map 118 includes data describing sequential dependencies between two or more enrichment types, such as data describing that a second enrichment type should be performed after a first enrichment type (e.g., because the second enrichment type performs data enrichment operations based on data determined using the data enrichment operations of the first enrichment type). In some examples, the controller routine 112 can use the enrichment map 118 to determine at least one of the set of required enrichment operations represented by the enrichment sequence of a datagram or the sequence associated with the set of required enrichment operations.

In some examples, after retrieving a datagram from the input pipeline 110, the controller routine 112 can be configured to determine an enrichment type associated with the datagram, such as an enrichment type that is the first/initial enrichment type in an enrichment sequence of the datagram. In some examples, if the controller routine 112 determines that a retrieved datagram is not associated with any enrichment types and/or is associated with an empty/null enrichment sequence, the controller routine 112 can store the retrieved datagram in the output pipeline 116. Accordingly, in some examples, the controller routine 112 enables conditional processing of a retrieved datagram based on whether the datagram is associated with an enrichment type and/or with a non-empty/non-null enrichment sequence. For example, in some examples, if the controller routine 112 determines that a datagram is associated with an enrichment type, the controller routine 112 stores the datagram on the enrichment pipeline for the enrichment module that corresponds to the enrichment type. In some examples, if the controller routine 112 determines that a datagram is not associated with any enrichment types and/or is associated with an empty/null enrichment sequence, the controller routine 112 can store the datagram in the output pipeline 116. Example techniques for conditional processing of datagrams retrieved from the input pipeline 110 are described in greater detail below with reference to FIG. 3.

As further depicted in FIG. 1, the enrichment modules 114 can be configured to receive a datagram from the controller routine 112, process the received datagram to determine an enriched datagram, and store the enriched datagram on the input pipeline 110. In some examples, the enrichment modules 114 include L enrichment modules, where each of the L enrichment modules is associated with a respective one of L enrichment types and is configured to receive a datagram that is associated with the associated enrichment type, process the received datagram using data enrichment operations corresponding to the associated enrichment type to determine an enriched datagram, and store the enriched datagram in the input pipeline 110. In some examples, a first enrichment module that is associated with a first enrichment type includes a first enrichment pipeline and a first enrichment routine. In some examples, after the controller routine 112 determines that a datagram is associated with the first enrichment type, the controller routine 112 stores the datagram in the first enrichment pipeline. In some examples, after the controller routine 112 stores the datagram in the first enrichment pipeline, the first enrichment routine retrieves the datagram from the first enrichment pipeline, processes the received datagram to determine an enriched datagram, and stores the enriched datagram on the input pipeline 110. Example architectures for enrichment modules are described below with reference to FIG. 2.

As further depicted in FIG. 1, the controller routine 112 can use data in the enrichment map 118 to determine the enrichment sequence for a datagram. In some examples, the enrichment sequence for a datagram includes a first set of required enrichment types for a datagram category associated with the datagram and/or a second set of required enrichment types that include one or more user-defined enrichment types provided as part of the datagram. In some examples, the enrichment map 118 includes data representing that the datagram category is associated with the first set of required enrichment types. For example, the enrichment map 118 can associate each datagram category in a schema of datagram categories with a corresponding set of required enrichment types. In some examples, the enrichment map 118 includes data describing sequential dependencies between two or more enrichment types, such as data describing that a second enrichment type should be performed after a first enrichment type (e.g., because the second enrichment type performs data enrichment operations based on data determined using the data enrichment operations of the first enrichment type). Accordingly, in some examples, the controller routine 112 can use the enrichment map 118 to determine at least one of the set of required enrichment operations represented by the enrichment sequence of a datagram or the sequence associated with the set of required enrichment operations.

As further depicted in FIG. 1, the output pipeline 116 is configured to store a datagram that is provided by the controller routine 112. In some examples, the controller routine 112 determines whether to store a datagram retrieved from the input pipeline 110 on the output pipeline 116 based on whether the retrieved datagram is not associated with any enrichment types and/or is associated with an empty/null enrichment sequence. For example, in some examples, the controller routine 112 stores a datagram retrieved from the input pipeline 110 on the output pipeline 116 if the controller routine 112 determines that the retrieved datagram is not associated with any enrichment types and/or is associated with an empty/null enrichment sequence.

Figure 2:
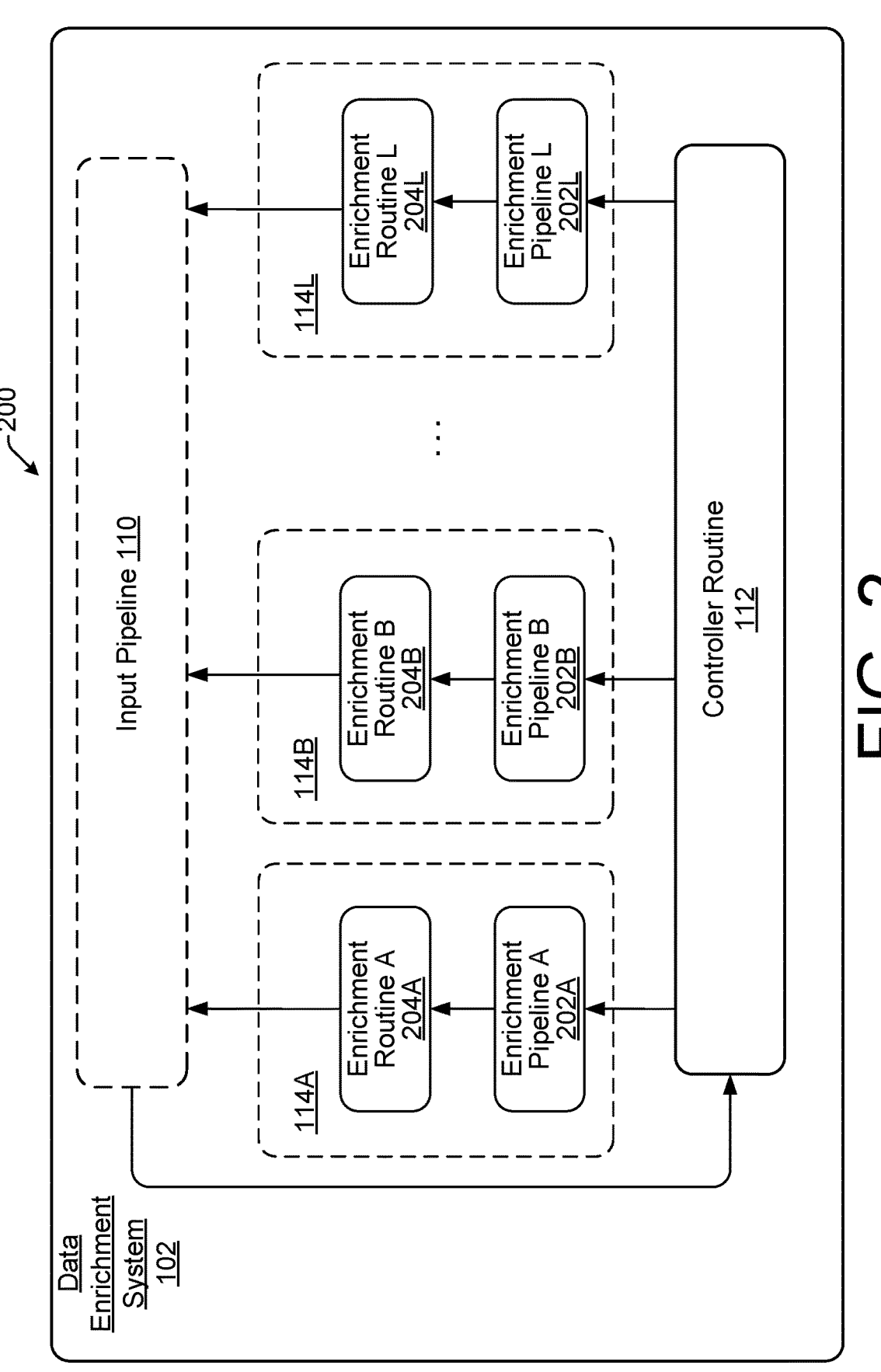
FIG. 2 provides an example architecture for a data enrichment system.

FIG. 2 provides an example architecture 200 for the data enrichment system 102 of FIG. 1. As depicted in FIG. 2, the architecture 200 includes: (i) the input pipeline 110 that is configured to store at least one of an unenriched datagram or an enriched datagram determined by an enrichment module, (ii) the controller routine 112 that is configured to retrieve a datagram from the input pipeline 110, determine an enrichment type associated with the retrieved datagram, and provide the retrieved datagram to the enrichment module that corresponds to the determined enrichment type, and (iii) the set of L enrichment modules 114A-114L, where each enrichment module is: (a) associated with a corresponding enrichment type, and (b) configured to process a datagram associated with the corresponding enrichment type in accordance with the corresponding enrichment type to determine an enriched datagram and to store the enriched datagram in the input pipeline 110.

As further depicted in FIG. 2, each enrichment module 114A-114L includes an enrichment pipeline 202A-202L and an enrichment routine 204A-204L. In some examples, an enrichment pipeline is configured to store any datagram that is associated with a corresponding enrichment type. In some examples, the enrichment pipeline is a queue data structure. In some examples, the enrichment pipeline is associated with an event emitter routine. In some examples, the event emitter routine of the enrichment pipeline is configured to: (i) maintain a list of routines that are subscribed to the event emitter routine, (ii) detect the addition of a datagram to the enrichment pipeline, and (iii) provide a notification to each subscribed routine on the list based on detecting the addition of the datagram to the enrichment pipeline. In some examples, a notification provided by the event emitter routine of the enrichment pipeline represents that a datagram has been added to the enrichment pipeline. In some examples, the list of subscribers to the event emitter routine of the enrichment pipeline includes the enrichment routine that is associated with the same enrichment type.

In some examples, the enrichment pipeline maintains an ordering of the datagrams stored on the enrichment pipeline, such as a queue ordering. In some examples, the ordering of the datagrams stored on the enrichment pipeline is based on the times in which the datagrams are added to the enrichment pipeline, for example such that the enrichment pipeline operates in a first-in-first-out (FIFO) manner. In some examples, the ordering of the datagrams stored on the enrichment pipeline is based on priorities of the datagrams, for example such that the controller routine 112 may retrieve a more system-critical datagram before a less-system-critical datagram. In some examples, the ordering of the datagrams stored on the enrichment pipeline is based on both the times in which the datagrams are added to the enrichment pipeline and the priorities of the datagrams stored on the enrichment pipeline. For example, in some examples, a controller routine combines (e.g., multiplies) a priority score and a latency score of a datagram that is stored on the enrichment pipeline to determine an adjusted priority score for the datagram. In some examples, the controller routine orders datagrams stored on the enrichment pipeline based on corresponding adjusted priority scores, such as based on a descending ordering of the adjusted priority scores for the datagrams stored on the enrichment pipeline.

In some examples, an enrichment routine is a computer-implemented routine that is configured to retrieve a datagram from the enrichment pipeline, process the retrieved datagram in accordance with operations corresponding to the enrichment type that is associated with the enrichment routine to determine an enriched datagram, and store the enriched datagram on the input pipeline 110. In some examples, the enrichment routine is configured to retrieve a first/initial datagram stored on the enrichment pipeline as determined in accordance with the ordering associated with the datagrams stored on the enrichment pipeline. In some examples, the enrichment routine is associated with one or more execution threads, where each execution thread is configured to retrieve a datagram from the enrichment pipeline and determine an enriched datagram for the retrieved datagram. In some examples, when the number of execution threads associated with the enrichment routine is more than one, the enrichment routine enables parallelized processing of datagrams retrieved from the enrichment pipeline, such that the enrichment routine can retrieve a datagram from the enrichment pipeline before the enrichment routine determines the enriched datagram associated with a previously-retrieved datagram. In some examples, the enrichment routine is configured to retrieve a datagram from the enrichment pipeline based on receiving a notification from the event emitter routine associated with the enrichment pipeline. In some examples, the notification represents that a new datagram has been added to the enrichment pipeline. In some examples, the enrichment routine is subscribed to the event emitter routine associated with the enrichment pipeline.

FIG. 3 is a flowchart diagram of an example process 300 for performing operations of a controller routine, such as the controller routine 112 of FIGS. 1-2. As depicted in FIG. 3, at operation 302, the process 300 includes retrieving a datagram from an input pipeline, such as the input pipeline 110 of FIGS. 1-2. In some examples, the controller routine retrieves a datagram from the input pipeline based on receiving a notification from an event emitter routine associated with the input pipeline. In some examples, the controller routine retrieves a datagram from the input pipeline based on an ordering of the datagrams stored in the input pipeline.

At operation 304, the process 300 includes determining an enrichment sequence for the retrieved datagram. The enrichment sequence can represent a sequence of required enrichment types according to which the first datagram should be processed. For example, a first datagram that the controller routine retrieves from the input pipeline can represent a first Internet Protocol (IP) address associated with a system security exposure event. The controller routine can process the first datagram to determine the enrichment sequence $T_1 \rightarrow T_2 \rightarrow T_3$, where $T_1$ is an enrichment type associated with determining an internet provider of the IP address associated with an event, $T_2$ is an enrichment type associated with determining a security protocol associated with the determined internet provider, and $T_3$ is an enrichment type associated with determining a system exposure history associated with the determined security protocol.

At operation 306, the process 300 includes determining whether the enrichment sequence for the datagram is empty. In some examples, the enrichment sequence for a datagram is empty when the datagram has been subject to all enrichments that are required for the datagram as represented by the enrichment sequence associated with the datagram. For example, in accordance the example enrichment sequence described in the preceding paragraph, the controller routine can store the first datagram in an enrichment pipeline for $T_1$, after which an enrichment routine for $T_1$ can retrieve the first datagram and process the first datagram using enrichment operations associated with $T_1$ to determine a second datagram. The enrichment routine for $T_1$ can then store the second datagram in the input pipeline. After the second datagram is stored in the input pipeline, the controller routine can retrieve the second datagram from the input pipeline and determine that the second datagram is associated with the enrichment sequence $T_2 \rightarrow T_3$. In accordance with the corresponding enrichment sequence $T_2 \rightarrow T_3$, the controller routine can store the second datagram in an enrichment pipeline for $T_2$, after which an enrichment routine for $T_2$ can retrieve the second datagram and process the second datagram using enrichment operations associated with $T_2$ to determine a third datagram. The enrichment routine for $T_2$ can then store the third datagram in the input pipeline. After the third datagram is stored in the input pipeline, the controller routine can retrieve the third datagram from the input pipeline and determine that the second datagram is associated with the enrichment sequence $T_3$. In accordance with the corresponding enrichment sequence $T_3$, the controller routine can store the third datagram in an enrichment pipeline for $T_3$, after which an enrichment routine for $T_3$ can retrieve the third datagram and process the third datagram using enrichment operations associated with $T_3$ to determine a fourth datagram. The enrichment routine for $T_3$ can then store the fourth datagram can in the input pipeline. After the fourth datagram is stored in the input pipeline, the controller routine can retrieve the fourth datagram from the input pipeline, determine that the fourth datagram is associated with an empty enrichment sequence, and store the fourth datagram in an output pipeline based on determining that the fourth datagram is associated with an empty enrichment sequence.

At operation 308, the process 300 includes storing the datagram in an enrichment pipeline (e.g., either one of the enrichment pipelines 202A-202L as depicted in FIG. 2) based on determining that the enrichment sequence for the datagram is non-empty. In some examples, if the enrichment sequence for the datagram includes at least one enrichment type, then the controller routine stores datagram on the enrichment pipeline corresponding to the first/initial enrichment type in the enrichment sequence associated with the datagram. In some examples, the controller routine determines that a datagram is associated with an enrichment type based on a determination that the enrichment type is the first/initial enrichment type in the enrichment sequence for the datagram, which in turn represents that the datagram should be processed in accordance with the enrichment type prior to being processed in accordance with any other enrichment types. In some examples, after the controller routine determines that a datagram is associated with an enrichment type, the controller routine stores the datagram in the enrichment pipeline for the enrichment type. The enrichment pipeline can be a queue data structure.

At operation 310, the process 300 includes storing the datagram in an output pipeline (e.g., the output pipeline 116 of FIG. 1) based on determining that the enrichment sequence for the datagram is empty. In some examples, a controller routine stores a datagram in the output pipeline based on a determination that the datagram is associated with an empty enrichment sequence. In some examples, a controller routine stores a datagram in the output pipeline based on a determination that the datagram is not associated with any required enrichment types. The output pipeline can be a queue data structure. In some examples, the output pipeline is associated with an ordering of the datagrams in the output pipeline, such as an ordering that is based on at least one of the times at which datagrams were stored in the output pipeline or priorities associated with the datagrams stored in the output pipeline.

FIG. 4 is a flowchart diagram of an example process 400 for determining an enrichment type for a datagram. As depicted in FIG. 4, at operation 402, the process 400 includes detecting a datagram category for a datagram. The datagram category of a datagram can represent an attribute and/or type of an event, subject, and/or entity associated with the datagram. For example, a datagram representing an event can be associated with a datagram category that represents that the corresponding event is a DoS attack event. In some examples, the datagram category of a datagram is represented by a field of the datagram, such as by a header field of the datagram.

At operation 404, the process 400 includes determining a set of required enrichment types associated with the datagram category. In some examples, a controller routine determines the set of required enrichment types can for a datagram based on an enrichment map (e.g., the enrichment map 118 of FIG. 1). In some examples, the enrichment map can associate each datagram category in a schema of datagram categories with a corresponding set of required enrichment types. For example, the enrichment map can represent that a DoS attack category is associated with an enrichment type that corresponds to determining whether an IP address associated with a DoS attack event has a history of being part of previous DoS attacks.

At operation 406, the process 400 includes determining whether the datagram is associated with any user-defined enrichment types. In some examples, the datagram itself can require one or more enrichment types to be performed on the datagram. These required enrichment types can be provided by a user, such as a user who created the datagram and/or provided data included in the datagram. For example, a user can require that a datagram corresponding to a DoS attack event be enriched by providing geographic locations associated with the IP addresses that have participated in the corresponding DoS attack.

At operation 408, the process 400 includes updating the set of required enrichment types determined at operation 404 based on determining that the datagram is associated with at least one user-defined enrichment type. In some examples, a controller routine updates the set of required enrichment types to include the user-defined enrichment types. In some examples, in response to determining that a datagram is associated with at least one user-defined enrichment type, the controller routine adds the user-defined enrichment types to the set of required enrichment types associated with the datagram category of the datagram.

At operation 410, the process 400 includes determining a sequence of the enrichment types in the set of required enrichment types for the datagram (e.g., the set of required enrichment types determined at operation 404 or the updated set of required enrichment types determined at operation 408). In some examples, the sequence of required enrichment types is determined based on an enrichment map (e.g., the enrichment map 118 of FIG. 1). In some examples, the enrichment map includes data describing sequential dependencies between two or more enrichment types, such as data describing that a second enrichment type should be performed after a first enrichment type (e.g., because the second enrichment type performs data enrichment operations based on data determined using the data enrichment operations of the first enrichment type). Accordingly, in some examples, the enrichment map can be used to determine at least one of the set of required enrichment operations represented by the enrichment sequence of a datagram or the sequence associated with the set of required enrichment operations.

Figure 5:
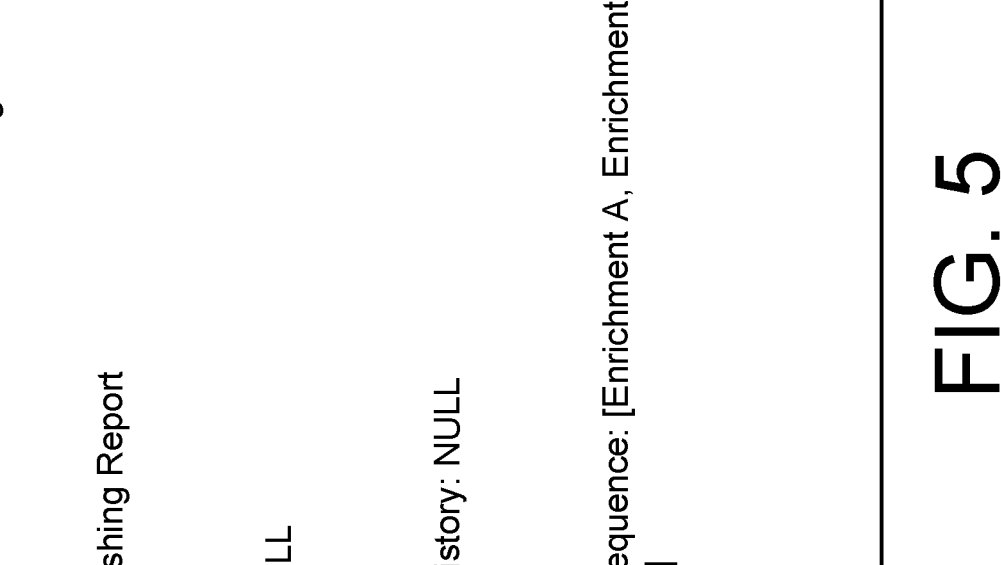
FIG. 5 provides an example of a datagram that is associated with a datagram identifier, a datagram category, a parent identifier, an enrichment history, an enrichment sequence, and a payload.

FIG. 5 provides an example of a datagram 500 that is associated with a datagram identifier, a datagram category, a parent identifier, an enrichment history, an enrichment sequence, and a payload. Datagram identifier can be a unique identifier of datagram 500.

Datagram category can represent an attribute and/or type of an event, subject, and/or entity associated with datagram 500. A parent identifier can be a unique identifier of a parent datagram for datagram 500. The parent datagram of datagram 500 is datagram that was enriched to determine datagram. As depicted in FIG. 5, the parent identifier of datagram 500 is empty, denoting that datagram 500 is an unenriched datagram. The enrichment history can represent a sequence of enrichment types/operations performed on an unenriched datagram that led to the determination of datagram 500. As depicted in FIG. 5, the enrichment history of datagram 500 is null, representing that that datagram 500 is an unenriched datagram with no history of prior enrichment types/operations. The enrichment sequence of datagram 500 can represent a sequence of required enrichment types for datagram 500. As depicted in FIG. 5, the enrichment sequence of datagram 500 requires the following sequence of required enrichment types: Enrichment A→Enrichment B→Enrichment C. As further depicted in FIG. 5, the payload of datagram includes only the single data field D1. In some examples, because the first/initial enrichment type in the enrichment sequence of datagram 500 is Enrichment A, a controller routine (e.g., the controller routine 112 of FIGS. 1-2) first stores datagram 500 in an input pipeline (e.g., the input pipeline 110 of FIGS. 1-2) and then moves datagram 500 to the enrichment pipeline associated with Enrichment A.

FIG. 6 provides an example of a datagram 600 that is determined by processing datagram 500 of FIG. 5 in accordance with the Enrichment A. Accordingly, the parent identifier of datagram 600 represents that that the parent of datagram 600 is datagram 500. Because datagram 600 is performed by performing operations of Enrichment A on datagram 500, the enrichment history of datagram 600 includes Enrichment A relative to the empty enrichment history of datagram 500, and the enrichment sequence of datagram 600 excludes Enrichment A relative to the enrichment sequence of datagram 500. Moreover, the payload of datagram 600 includes, in addition to the data field D1 of datagram 500, the data fields D2-D3 determined by performing operations corresponding to Enrichment A on datagram 500. In some examples, because the first/initial enrichment type in the enrichment sequence of datagram 600 is Enrichment B, an enrichment routine for Enrichment A first stores datagram 600 in an input pipeline (e.g., the input pipeline 110 of FIGS. 1-2) and then a controller routine (e.g., the controller routine 112 of FIS. 1-2) moves datagram 600 to the enrichment pipeline associated with Enrichment B.

FIG. 7 provides an example of a datagram 700 that is determined by processing datagram 600 of FIG. 6 in accordance with the Enrichment B. Accordingly, the parent identifier of datagram 700 represents that that the parent of datagram 700 is datagram 600. Because datagram 700 is performed by performing operations of Enrichment B on datagram 600, the enrichment history of datagram 700 includes Enrichment B relative to the enrichment history of datagram 600, and the enrichment sequence of datagram 700 excludes Enrichment B relative to the enrichment sequence of datagram 600. Moreover, the payload of datagram 700 includes, in addition to the data field D1 of datagram 500 and the data fields D2-D3 of datagram 600, the data field D4 determined by performing operations corresponding to Enrichment B on datagram 600. In some examples, because the first/initial enrichment type in the enrichment sequence of datagram 700 is Enrichment C, an enrichment routine associated with Enrichment B first stores datagram 700 in an input pipeline (e.g., the input pipeline 110 of FIGS. 1-2) and then a controller routine (e.g., the controller routine 112 of FIS. 1-2) moves datagram 700 to the enrichment pipeline associated with Enrichment C.

FIG. 8 provides an example of a datagram 800 that is determined by processing datagram 700 of FIG. 7 in accordance with the Enrichment C. Accordingly, the parent identifier of datagram 800 represents that that the parent of datagram 800 is datagram 700. Because datagram 800 is performed by performing operations of Enrichment C on datagram 700, the enrichment history of datagram 800 includes Enrichment C relative to the enrichment history of datagram 700, and the enrichment sequence of datagram 800 excludes Enrichment C relative to the enrichment sequence of datagram 700 (thus resulting in a null enrichment sequence). Moreover, the payload of datagram 800 includes, in addition to the data field D1 of datagram 500, the data fields D2-D3 of datagram 600, and the data field D4 of datagram 700, the data field D5 determined by performing operations corresponding to Enrichment C on datagram 700. In some examples, because datagram 800 has a null enrichment sequence, an enrichment routine first stores datagram 800 in an input pipeline (e.g., the input pipeline 110 of FIGS. 1-2) and then a controller routine (e.g., the controller routine 112 of FIS. 1-2) moves datagram 800 to an output pipeline (e.g., the output pipeline 116 of FIG. 1).

FIG. 9 is a flowchart diagram of an example process 900 for enriching data using a sequential enrichment workflow. As depicted in FIG. 9, at operation 902, the process 900 includes receiving incoming datagrams in an input pipeline (e.g., the input pipeline 110 of FIGS. 1-2). In some examples, the input pipeline is configured to store at least one of the following: an unenriched datagram that has not been processed by any enrollment modules or an enriched datagram that has been generated by one of the enrollment modules via processing another datagram. For example, an unenriched datagram can represent data associated with a data enrichment request provided to a data enrichment system (e.g., the data enrichment system 102 of FIGS. 1-2), such as event data associated with a recorded event that is associated with a data enrichment request provided to the data enrichment system.

At operation 904, the process 900 includes retrieving a datagram from the input pipeline. In some examples, the input pipeline is associated with an ordering of datagrams stored in the input pipeline, and a controller routine retrieves datagrams stored in the input pipeline based on the ordering. In some examples, at a retrieval time, the controller routine retrieves an initial datagram in the ordering from the input pipeline and subsequently removes the retrieved datagram from the input pipeline, so that the controller routine can retrieve a subsequent datagram in the ordering during a subsequent retrieval time. In some examples, ordering of datagrams stored in the input pipeline can be based on at least one of the times at which datagrams were stored in the input pipeline or priorities associated with the datagrams stored in the input pipeline.

At operation 906, the process 900 includes determining whether the datagram is associated with an enrichment type. In some examples, the enrichment type associated with the datagram is the enrichment type according to which the datagram should be processed before processing of the datagram in accordance with any other enrichment types. In some examples, the datagram is associated with the first/initial enrichment type in the enrichment sequence of the datagram. In some examples, a controller routine determines that a datagram is associated with an enrichment type if the enrichment sequence for the datagram is non-empty. In some examples, a controller routine determines that a datagram is not associated with an enrichment type if the enrichment sequence for the datagram is empty.

At operation 908, the process 900 includes storing the datagram on the output pipeline based on determining that the datagram is not associated with any enrichment types. In some examples, a controller routine stores a datagram on the output pipeline based on a determination that the datagram is associated with an empty enrichment sequence. In some examples, the output pipeline is associated with an ordering of the datagrams in the output pipeline, such as an ordering that is based on at least one of the times at which datagrams were stored in the output pipeline or priorities associated with the datagrams stored in the output pipeline.

At operation 910, the process 900 includes storing the datagram in an enrichment pipeline for a corresponding enrichment type based on determining that the datagram is associated with the corresponding enrichment type. In some examples, a controller routine determines that a datagram associated with an enrichment type based on a determination that the datagram should be processed in accordance with the enrichment type prior to being processed in accordance with any other enrichment types. In some examples, after the controller routine determines that a datagram is associated with an enrichment type, the controller routine stores the datagram in the enrichment pipeline for the enrichment type. The enrichment pipeline can be a queue data structure.

At operation 912, the process 900 includes retrieving the datagram from the enrichment pipeline of the corresponding enrichment type. In some examples, an enrichment routine of the corresponding enrichment type retrieves a datagram from an enrichment pipeline of the corresponding enrichment type after a thread associated with an enrichment routine of the enrichment type becomes available, such as after the enrichment routine is first executed or after the thread completes the determination of an enriched datagram based on a previously-retrieved datagram. In some examples, the enrichment routine retrieves a datagram from the enrichment pipeline after the enrichment routine receives a notification from an event emitter routine associated with the corresponding enrichment pipeline, where the notification can represent that a new datagram is newly stored in the enrichment pipeline.

At operation 914, the process 900 includes determining an enriched datagram based on the enrichment type. In some examples, an enrichment routine determines the enriched datagram by processing the datagram using data enrichment operations corresponding to the enrichment type. Accordingly, the enriched datagram can be the output of processing the datagram using data enrichment operations corresponding to the enrichment type.

At operation 916, the process 900 includes storing the enriched datagram on the input pipeline. In some examples, by storing both incoming datagrams and enriched datagrams in the input pipeline, the techniques described herein enable implementing sequential enrichment workflows using an iterative enrichment mechanism that utilizes a single data structure to store all datagrams whose enrichment completion statuses are pending, regardless of the enrichment histories of the datagrams in the single data structure. The input pipeline may, for example, be a queue data structure, such as a queue data structure whose ordering is based on at least one of the times at which datagrams were stored in the queue data structure or priorities associated with the datagrams stored in the queue data structure.

Figure 10:
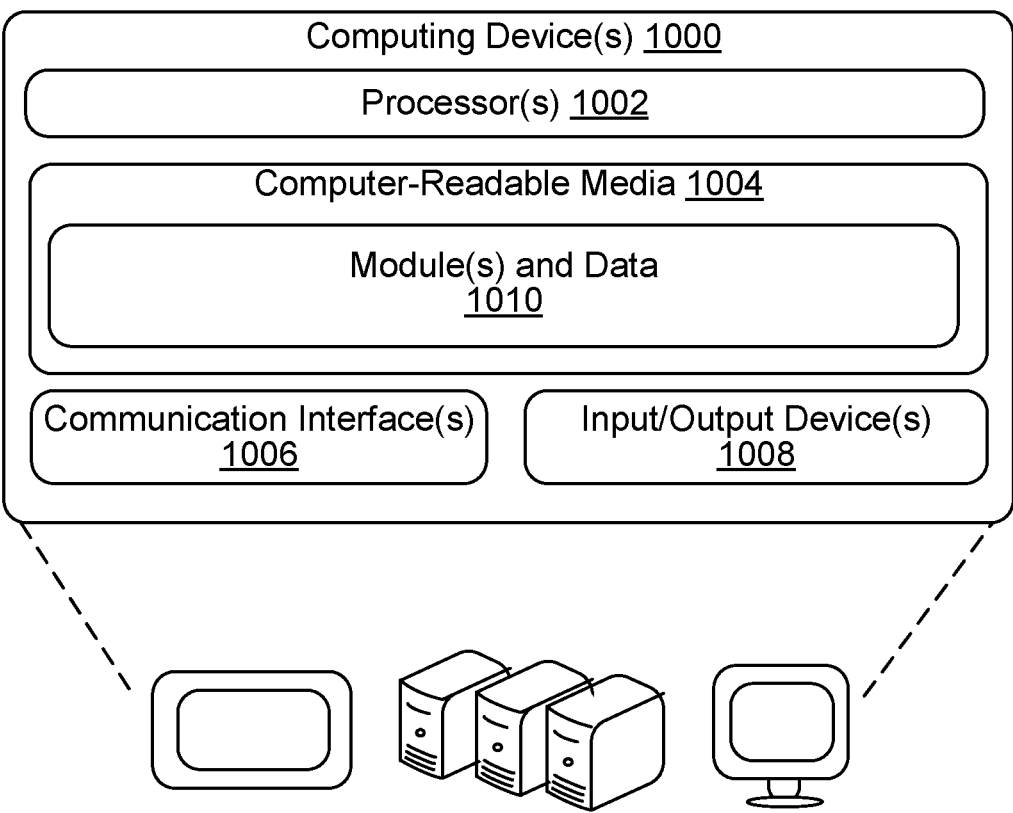
FIG. 10 provides an example computing device for performing techniques described herein.

FIG. 10 illustrates example computing device(s) 1000 for performing techniques described herein. The computing device(s) 1000 can comprise user device(s) including, but not limited to, mobile phone(s), personal digital assistant(s), netbook(s), laptop computer(s), desktop computer(s), networked computer(s), and/or any another electronic device(s) that are capable of transmitting or receiving data), server computing device(s). In some examples, the computing device(s) 1000 can comprise server computing device(s) (e.g., server(s)), which can be any type of server, such as a network-accessible server. In some examples, the server(s) can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed one or more remotely located devices instead of, or in addition to, the server(s).

In at least one example, the computing device(s) 1000 can include processor(s) 1002, computer-readable media 1004, communication interface(s) 1006, and input/output device(s) 1008.

The processor(s) 1002 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 1002 can execute one or more modules and/or processes to cause the computing device(s) 1000 to perform a variety of functionalities, as set forth above and explained in further detail in the following disclosure. Additionally, each of the processor(s) 1002 can possess its own local memory, which also can store program modules, program data, and/or one or more operating systems.

Computer-readable media can include volatile memory, nonvolatile memory, and/or other persistent and/or auxiliary computer-readable media, removable and non-removable computer-readable media implemented in any method or technology for storage of data such as computer readable instructions, data structures, program modules, or other data. Computer memory is an example of computer-readable media. Thus, computer-readable media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain data for access by a computing device.

In at least one example, the computer-readable media can include non-transitory computer-readable media. Non-transitory computer-readable media can include volatile and nonvolatile, removable and non-removable tangible, physical media implemented in technology for storage of data, such as computer readable instructions, data structures, program modules, or other data. The computer-readable media 1004 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the computing device(s) 1000. Any such non-transitory computer-readable media can be part of the computing device(s) 1000.

In contrast, communication media includes computer readable instructions, data structures, program modules, or other data in a modulated data signal, such as a carrier wave, or other transmission mechanism. As defined herein, computer-readable media does not include communication media.

In at least one example, the computer-readable media 1004 can store module(s) and data 1010. The module(s) and data 1010 can be in the form of stand-alone applications, productivity applications, an operating system component, or any other application or software module.

The communication interface(s) 1006 can include one or more interfaces and hardware components for enabling communication with various other devices, such as over network(s) or directly. For example, communication interface(s) 1006 can enable communication through one or more networks, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, low power area networks (LPWAN) or any other such network, or any combination thereof. Components used for such communications can depend at least in part upon the type of network, the environment selected, or both. Protocols for communicating over such networks are well known and will not be discussed herein in detail.

In at least one example, the one or more input/output (I/O) devices 1008 can include speakers, a microphone, a camera, a display, a haptic output device, various user controls (e.g., buttons, a joystick, a keyboard, a keypad, etc.), and so forth.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation can be used in conjunction with components or steps of other examples. For example, the components and instructions of FIG. 10 can utilize the processes and flows of FIGS. 1-4.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some examples the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

A: A system comprising: one or more processors; and one or more computer readable media storing computer executable instructions that, when executed, cause the system to perform operations comprising: determining that a datagram is associated with a first enrichment type, wherein datagram is retrieved from an input pipeline; storing the datagram in a first enrichment pipeline associated with the first enrichment type; determining, using a first enrichment routine, a first enriched datagram, wherein the first enrichment routine is configured to process datagrams in the first enrichment pipeline using operations corresponding to the first enrichment type; and storing the first enriched datagram in the input pipeline.

B: The system of paragraph A, the operations further comprising: determining a sequence of enrichment types for the datagram; determining that the first enrichment type is associated with a first position in the sequence; and determining that the datagram is associated with the first enrichment type in response to determining that the first enrichment type is associated with the first position.

C: The system of paragraph B, the operations further comprising: determining the sequence based on a user-defined enrichment type for the datagram.

D: The system of paragraph B or C, the operations further comprising: determining the sequence based on an enrichment map for a datagram category of the datagram.

E: The system of any of paragraphs A-D, the operations further comprising: retrieving the first enriched datagram from the input pipeline; determining that the first enriched datagram is associated with a second enrichment type; storing the first enriched datagram in a second enrichment pipeline for the second enrichment type; determining, using a second enrichment routine, a second enriched datagram, wherein the second enrichment routine is configured to process datagrams in the second enrichment pipeline using operations corresponding to the second enrichment type; and storing the second enriched datagram in the input pipeline.

F: The system of paragraph E, the operations further comprising: determining that the second enriched datagram is associated with the datagram; determining that the datagram is associated with a sequence of enrichment types; and determining that the second enrichment type is associated with a second position in the sequence.

G: The system of paragraph E or F, the operations further comprising: determining a sequence of enrichment types for the first enriched datagram; and determining that the second enrichment type is associated with a first position in the sequence.

H: The system of paragraph G, wherein the sequence of enrichment types for the first enriched datagram is determined based on a sequence of enrichment types for the datagram.

I: The system of paragraph G or H, wherein the sequence of enrichment types for the first enriched datagram comprises at least one enrichment type that is not in a sequence of enrichment types for the datagram.

J: The system of any of paragraphs E-I, the operations further comprising: determining that the second enriched datagram is not associated with any enrichment types; and storing the second enriched datagram in an output pipeline.

K: The system of any of paragraphs A-J, wherein the input pipeline comprises a queue data structure.

L: The system of any of paragraphs A-K, the operations further comprising: determining a sequence of enrichment types for a retrieved datagram; and storing the retrieved datagram in an enriched pipeline in response to determining that the sequence is empty.

M: A method comprising: determining that a datagram is associated with a first enrichment type, wherein datagram is retrieved from an input pipeline; storing the datagram in a first enrichment pipeline associated with the first enrichment type; determining, using a first enrichment routine, a first enriched datagram, wherein the first enrichment routine is configured to process datagrams in the first enrichment pipeline using operations corresponding to the first enrichment type; and storing the first enriched datagram in the input pipeline.

N: The method of paragraph M, further comprising: determining a sequence of enrichment types for the datagram; determining that the first enrichment type is associated with a first position in the sequence; and determining that the datagram is associated with the first enrichment type in response to determining that the first enrichment type is associated with the first position.

O: The method of paragraph N, further comprising: determining the sequence based on a user-defined enrichment type for the datagram.

P: The method of paragraph N or O, further comprising: determining the sequence based on an enrichment map for a datagram category of the datagram.

Q: The method of any of paragraphs M-P, further comprising: retrieving the first enriched datagram from the input pipeline; determining that the first enriched datagram is associated with a second enrichment type; storing the first enriched datagram in a second enrichment pipeline for the second enrichment type; determining, using a second enrichment routine, a second enriched datagram, wherein the second enrichment routine is configured to process datagrams in the second enrichment pipeline using operations corresponding to the second enrichment type; and storing the second enriched datagram in the input pipeline.

R: One or more non-transitory computer-readable media storing instructions executable by one or more processors, wherein the instructions, when executed, cause the one or more processors to perform operations comprising: determining that a datagram is associated with a first enrichment type, wherein datagram is retrieved from an input pipeline; storing the datagram in a first enrichment pipeline associated with the first enrichment type; determining, using a first enrichment routine, a first enriched datagram, wherein the first enrichment routine is configured to process datagrams in the first enrichment pipeline using operations corresponding to the first enrichment type; and storing the first enriched datagram in the input pipeline.

S: The non-transitory computer-readable media of paragraph R, the operations further comprising: determining a sequence of enrichment types for the datagram; determining that the first enrichment type is associated with a first position in the sequence; and determining that the datagram is associated with the first enrichment type in response to determining that the first enrichment type is associated with the first position.

T: The non-transitory computer-readable media of paragraph S, the operations further comprising: determining the sequence based on a user-defined enrichment type for the datagram.

What is claimed is:

1. A system comprising:
one or more processors; and
one or more computer readable media storing computer executable instructions that, when executed, cause the system to perform operations comprising:
   determining that a datagram is associated with a first sequence of enrichment types comprising a first enrichment type followed by a second enrichment type, wherein the datagram is retrieved from an input pipeline;
   storing the datagram in a first enrichment pipeline associated with the first enrichment type;
   determining, using a first enrichment routine, a first enriched datagram, wherein the first enrichment routine is configured to process datagrams in the first enrichment pipeline using a first set of operations corresponding to the first enrichment type;
   storing the first enriched datagram in the input pipeline as a child datagram of the datagram;
   retrieving the first enriched datagram from the input pipeline;
   determining, based on a feature associated with the first enriched datagram, that the first enriched datagram is associated with a third enrichment type, wherein the third enrichment type is outside of the first sequence of enrichment types; and
   based on determining that the first enriched datagram is the child datagram of the datagram, determining that the first enriched datagram is associated with a second sequence for enrichment types comprising the second enrichment type and the third enrichment type.

2. The system of claim 1, the operations further comprising:
   determining a sequence of enrichment types for the datagram;
   determining that the first enrichment type is associated with a first position in the sequence; and
   determining that the datagram is associated with the first enrichment type in response to
   determining that the first enrichment type is associated with the first position.

3. The system of claim 2, the operations further comprising:
   determining the sequence based on a user-defined enrichment type for the datagram.

4. The system of claim 2, the operations further comprising:
   determining the sequence based on an enrichment map for a datagram category of the datagram.

5. The system of claim 1, the operations further comprising:
   retrieving the first enriched datagram from the input pipeline;
   determining that the first enriched datagram is associated with a second enrichment type;
   storing the first enriched datagram in a second enrichment pipeline for the second enrichment type;
   determining, using a second enrichment routine, a second enriched datagram, wherein the second enrichment routine is configured to process datagrams in the second enrichment pipeline using operations corresponding to the second enrichment type; and
   storing the second enriched datagram in the input pipeline.

6. The system of claim 5, the operations further comprising:
   determining that the second enriched datagram is associated with the datagram;
   determining that the datagram is associated with a sequence of enrichment types; and
   determining that the second enrichment type is associated with a second position in the sequence.

7. The system of claim 5, the operations further comprising:
   determining a sequence of enrichment types for the first enriched datagram; and
   determining that the second enrichment type is associated with a first position in the sequence.

8. The system of claim 7, wherein the sequence of enrichment types for the first enriched datagram is determined based on a sequence of enrichment types for the datagram.

9. The system of claim 7, wherein the sequence of enrichment types for the first enriched datagram comprises at least one enrichment type that is not in a sequence of enrichment types for the datagram.

10. The system of claim 5, the operations further comprising:
   determining that the second enriched datagram is not associated with any enrichment types; and
   storing the second enriched datagram in an output pipeline.

11. The system of claim 1, wherein the input pipeline comprises a queue data structure.

12. The system of claim 1, the operations further comprising:
   determining a sequence of enrichment types for a retrieved datagram; and
   storing the retrieved datagram in an enriched pipeline in response to determining that the sequence is empty.

13. A method comprising:
   determining that a datagram is associated with a first sequence of enrichment types comprising a first enrichment type followed by a second enrichment type, wherein the datagram is retrieved from an input pipeline;
   storing the datagram in a first enrichment pipeline associated with the first enrichment type;
   determining, using a first enrichment routine, a first enriched datagram, wherein the first enrichment routine is configured to process datagrams in the first enrichment pipeline using a first set of operations corresponding to the first enrichment type;
   storing the first enriched datagram in the input pipeline as a child datagram of the datagram;

retrieving the first enriched datagram from the input pipeline;

determining, based on a feature associated with the first enriched datagram, that the first enriched datagram is associated with a third enrichment type, wherein the third enrichment type is outside of the first sequence of enrichment types; and based on determining that the first enriched datagram is the child datagram of the datagram, determining that the first enriched datagram is associated with a second sequence for enrichment types comprising the second enrichment type and the third enrichment type.

14. The method of claim 13, further comprising:

determining a sequence of enrichment types for the datagram;

determining that the first enrichment type is associated with a first position in the sequence; and determining that the datagram is associated with the first enrichment type in response to determining that the first enrichment type is associated with the first position.

15. The method of claim 14, further comprising:

determining the sequence based on a user-defined enrichment type for the datagram.

16. The method of claim 14, further comprising:

determining the sequence based on an enrichment map for a datagram category of the datagram.

17. The method of claim 13, further comprising:

retrieving the first enriched datagram from the input pipeline;

determining that the first enriched datagram is associated with a second enrichment type; storing the first enriched datagram in a second enrichment pipeline for the second enrichment type;

determining, using a second enrichment routine, a second enriched datagram, wherein the second enrichment routine is configured to process datagrams in the second enrichment pipeline using operations corresponding to the second enrichment type; and storing the second enriched datagram in the input pipeline.

18. One or more non-transitory computer-readable media storing instructions executable by one or more processors, wherein the instructions, when executed, cause the one or more processors to perform operations comprising:

determining that a datagram is associated with a first sequence of enrichment types comprising a first enrichment type followed by a second enrichment type, wherein the datagram is retrieved from an input pipeline;

storing the datagram in a first enrichment pipeline associated with the first enrichment type;

determining, using a first enrichment routine, a first enriched datagram, wherein the first enrichment routine is configured to process datagrams in the first enrichment pipeline using a first set of operations corresponding to the first enrichment type;

storing the first enriched datagram in the input pipeline as a child datagram of the datagram;

retrieving the first enriched datagram from the input pipeline;

determining, based on a feature associated with the first enriched datagram, that the first enriched datagram is associated with a third enrichment type, wherein the third enrichment type is outside of the first sequence of enrichment types; and based on determining that the first enriched datagram is the child datagram of the datagram, determining that the first enriched datagram is associated with a second sequence for enrichment types comprising the second enrichment type and the third enrichment type.

19. The non-transitory computer-readable media of claim 18, the operations further comprising:

determining a sequence of enrichment types for the datagram;

determining that the first enrichment type is associated with a first position in the sequence; and determining that the datagram is associated with the first enrichment type in response to determining that the first enrichment type is associated with the first position.

20. The non-transitory computer-readable media of claim 19, the operations further comprising:

determining the sequence based on a user-defined enrichment type for the datagram.

* * * * *